US010430967B2

(12) United States Patent
Hirota et al.

(10) Patent No.: US 10,430,967 B2
(45) Date of Patent: Oct. 1, 2019

(54) INFORMATION PROCESSING APPARATUS, METHOD, AND PROGRAM

(71) Applicant: CANON KABUSHIKI KAISHA, Tokyo (JP)

(72) Inventors: Yuichiro Hirota, Tokyo (JP); Keisuke Tateno, Munich (DE); Masahiro Suzuki, Kawasaki (JP); Daisuke Kotake, Yokohama (JP); Akihiro Katayama, Tokyo (JP); Masakazu Fujiki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 15/574,814

(22) PCT Filed: May 13, 2016

(86) PCT No.: PCT/JP2016/002365
§ 371 (c)(1),
(2) Date: Nov. 16, 2017

(87) PCT Pub. No.: WO2016/185704
PCT Pub. Date: Nov. 24, 2016

(65) Prior Publication Data
US 2018/0144497 A1 May 24, 2018

(30) Foreign Application Priority Data

May 20, 2015 (JP) .................................. 2015-102825
Apr. 7, 2016 (JP) .................................. 2016-077328

(51) Int. Cl.
*G06T 7/73* (2017.01)
*G06F 3/03* (2006.01)
(Continued)

(52) U.S. Cl.
CPC ............... *G06T 7/73* (2017.01); *G06F 3/011* (2013.01); *G06F 3/012* (2013.01); *G06F 3/0325* (2013.01);
(Continued)

(58) Field of Classification Search
None
See application file for complete search history.

(56) References Cited

U.S. PATENT DOCUMENTS 8,965,107 B1* 2/2015 Schpok .............. G06K 9/00201
382/154
2005/0168486 A1* 8/2005 Sato .................... A63F 13/10
345/633
(Continued)

FOREIGN PATENT DOCUMENTS

| JP | 2006-127468 A | 5/2006 |
| KR | 10-2011-0016160 A | 2/2011 |
| WO | 2013/161182 A1 | 10/2013 |

OTHER PUBLICATIONS

Manning Wang, et al., "Improving target registration accuracy in image-guided neurosurgery by optimizing the distribution of fiducial points", XP055525334, The International Journal of Medical Robotics and Computer Assisted Surgery, vol. 5, No. 1, pp. 26-31, Dec. 23, 2008.
(Continued)

Primary Examiner — Fayyaz Alam
(74) Attorney, Agent, or Firm — Canon U.S.A., Inc. I.P. Division

(57) ABSTRACT

In order to shorten the time required for a setting operation of features, an information processing apparatus includes an acquisition unit configured to acquire features used for deriving a positional attitude of an imaging device from an image captured by the imaging device, a setting unit configured to set a plurality of partial regions included in the
(Continued)

image as a plurality of candidate regions to which a feature is to be added, an evaluation unit configured to evaluate the plurality of set candidate regions, a determination unit configured to determine a position and/or an orientation of a feature to be newly added based on the plurality of evaluated candidate regions, and an output unit configured to output the determined position and/or the orientation.

19 Claims, 14 Drawing Sheets

(51) Int. Cl.
G06K 9/00 (2006.01)
G06F 3/01 (2006.01)
G06K 9/32 (2006.01)

(52) U.S. Cl.
CPC ....... *G06K 9/00671* (2013.01); *G06K 9/3216* (2013.01); *G06T 2207/30204* (2013.01); *G06T 2207/30244* (2013.01)

(56) References Cited

U.S. PATENT DOCUMENTS

| | | |
|---|---|---|
| 2005/0256396 A1 | 11/2005 | Takemoto |
| 2006/0071946 A1 | 4/2006 | Anabuki et al. |
| 2008/0285854 A1 | 11/2008 | Kotake et al. |
| 2009/0243889 A1* | 10/2009 | Suhr .................. G06K 9/00812 340/932.2 |
| 2011/0002544 A1* | 1/2011 | Oshima ................ G06K 9/6211 382/190 |
| 2011/0044504 A1* | 2/2011 | Oi ............................. G06T 7/73 382/103 |
| 2014/0177965 A1* | 6/2014 | Hamada ................... G06K 9/46 382/192 |
| 2014/0368645 A1* | 12/2014 | Ahuja .................... H04N 7/183 348/143 |
| 2015/0077434 A1* | 3/2015 | Fukuchi ................. G06F 3/011 345/633 |
| 2015/0172626 A1* | 6/2015 | Martini ................ G06T 7/0008 348/50 |

OTHER PUBLICATIONS

David Nister, et al., "Visual Odometry for Ground Vehicle Applications", XP009133367, Journal of Field Robotics, vol. 23, No. 1, pp. 3-20, published in Jan. 2006.

International Search Report and Written Opinion for PCT/JP2016/002365 and notification of transmittal of the ISR/WO, dated Jul. 26, 2016.

Rosten, et al., "Machine learning for high-speed corner detection", Department of Engineering, Cambridge University, UK, European Conference on Computer Vision, May 2006.

* cited by examiner

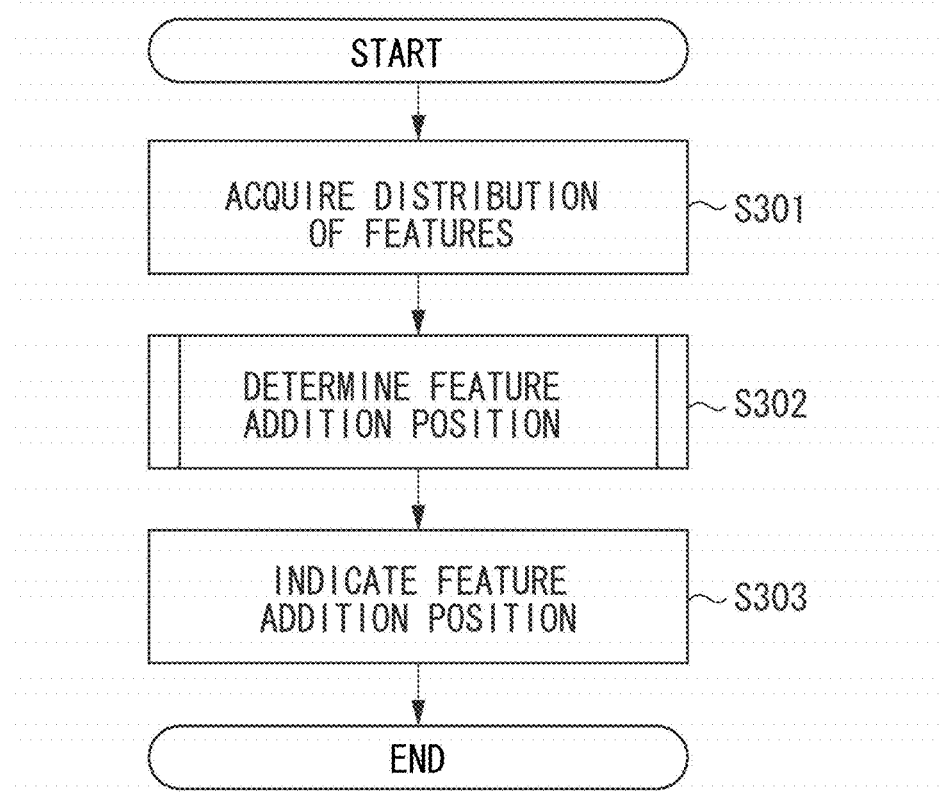

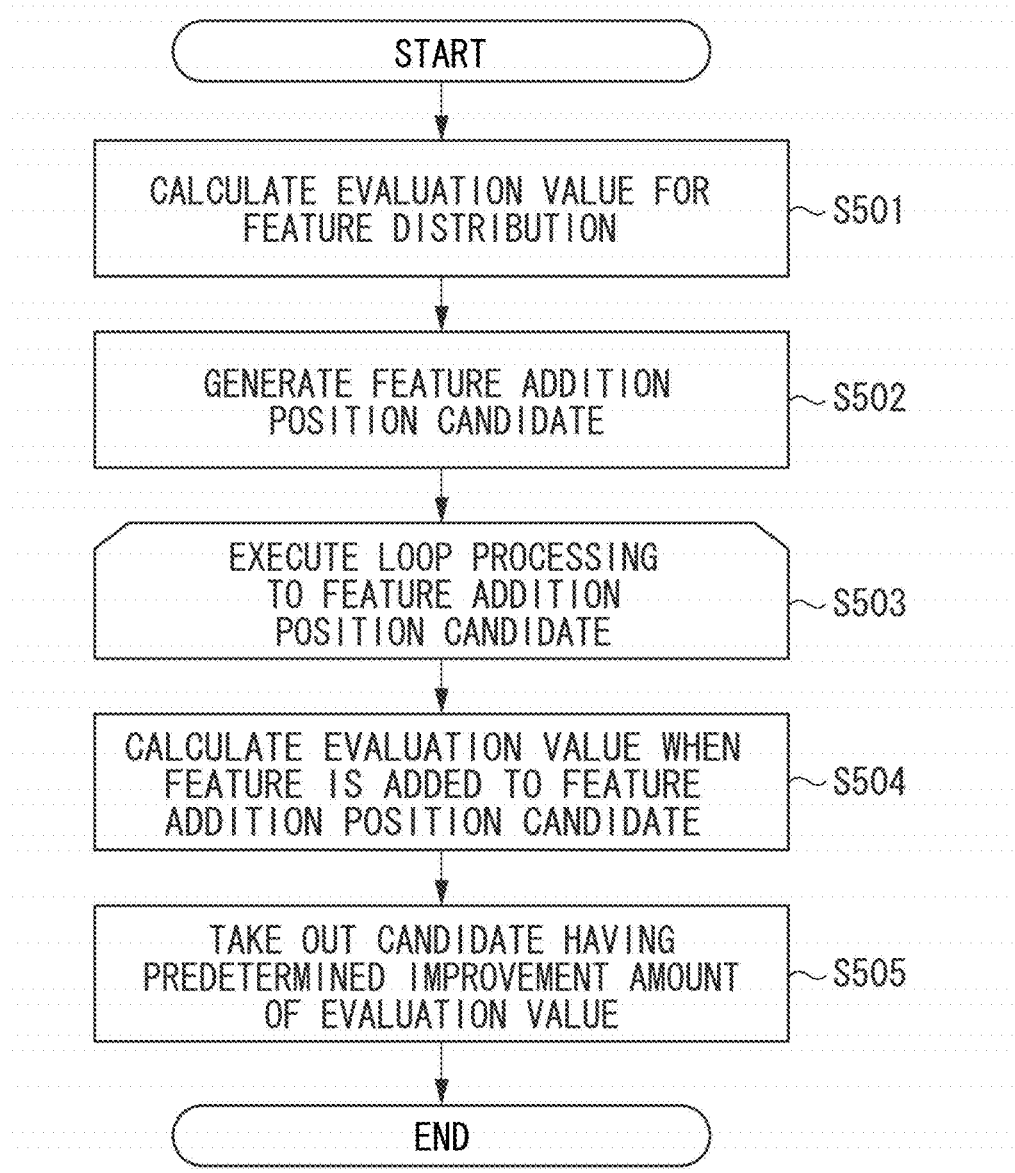

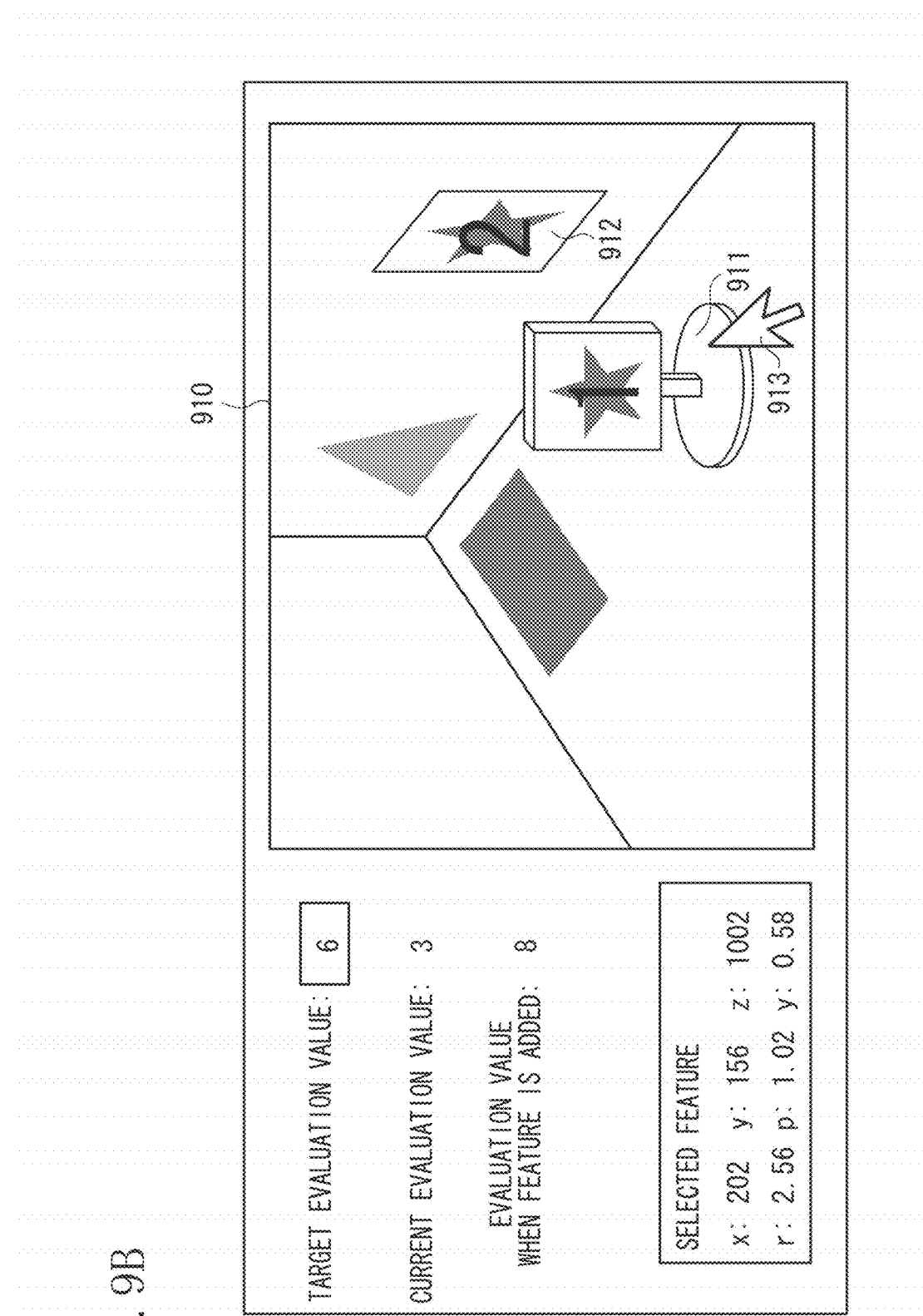

INFORMATION PROCESSING APPARATUS, METHOD, AND PROGRAM

CROSS-REFERENCE TO RELATED APPLICATIONS

This application is a national phase application of international application PCT/JP2016/002365, filed on May 13, 2016, which is hereby incorporated by reference herein in its entirety, and this application claims the benefit of Japanese Patent Application No. 2015-102825, filed May 20, 2015, and Japanese Patent Application No. 2016-077328, filed Apr. 7, 2016, which are hereby incorporated by reference herein in their entireties.

TECHNICAL FIELD

The present invention relates to a technique for calculating a camera positional attitude based on features in a captured image.

BACKGROUND ART

A technique for calculating a positional attitude of a camera based on features (i.e., natural feature points or markers) appearing on an image captured by the camera is widely used in a mixed reality (MR) system or an augmented reality (AR) system.

Generally, precision of the positional attitude of the camera calculated by the above-described technique is fluctuated by the arrangement status of features in a scene. Thus, in order to calculate the positional attitude of the camera with desired precision, arrangement of the features needs to be previously adjusted so that calculation precision of the positional attitude of the camera is improved. However, it is difficult for a user to determine the arrangement of features that can improve the calculation precision of the positional attitude of the camera.

Therefore, a technique for assisting an operation of arranging the features has been developed in order to improve the calculation precision of the positional attitude of the camera. The patent literature 1 (PTL 1) discusses a technique for assisting arrangement of markers (i.e., printed materials in which identifiers are coded into predetermined geometric patterns) when a camera positional attitude is to be estimated by using the markers as features. According to the technique, a spatial region where the camera positional attitude can be calculated with high precision in the current marker arrangement is visualized. While checking the spatial region where the camera positional attitude can be calculated with high precision, a user interactively adds a marker so that the spatial region covers a desired region.

CITATION LIST

Patent Literature

PTL 1: Japanese Patent Application Laid-Open No. 2006-127468

Non Patent Literature

NPL 1: E. Rosten and T. Drummond (May 2006). "Machine learning for high-speed corner detection". European Conference on Computer Vision.

SUMMARY OF INVENTION

Technical Problem

However, since a process of trial and error, i.e., tentatively arranging markers and checking a result thereof, has to be executed repeatedly in the above-described method, a setting operation of the features requires time.

Solution to Problem

According to an aspect of the present invention, an information processing apparatus includes an acquisition unit configured to acquire features used for deriving a positional attitude of an imaging device from an image captured by the imaging device,
a setting unit configured to set a plurality of partial regions included in the image as a plurality of candidate regions to which a feature is to be added, an evaluation unit configured to evaluate the plurality of set candidate regions, a determination unit configured to determine a position and/or an orientation of a feature to be newly added based on the plurality of evaluated candidate regions, and an output unit configured to output the determined position and/or the orientation.

Advantageous Effects of Invention

According to the present invention, the time required for a setting operation of features can be shortened.

Further features of the present invention will become apparent from the following description of exemplary embodiments with reference to the attached drawings.

BRIEF DESCRIPTION OF DRAWINGS

FIG. 3 is a flowchart according to the present invention.

FIG. 5 is a flowchart illustrating a determination method of a feature addition position according to the present invention.

FIG. 9B is a diagram illustrating an example of a screen for indicating an addition positional attitude of a feature object according to the present invention.

DESCRIPTION OF EMBODIMENTS

Prior to the description of exemplary embodiments of the present invention, a hardware configuration on which an information processing apparatus described in each of the exemplary embodiments is mounted will be described with reference to FIG. 1.

Figure 1:
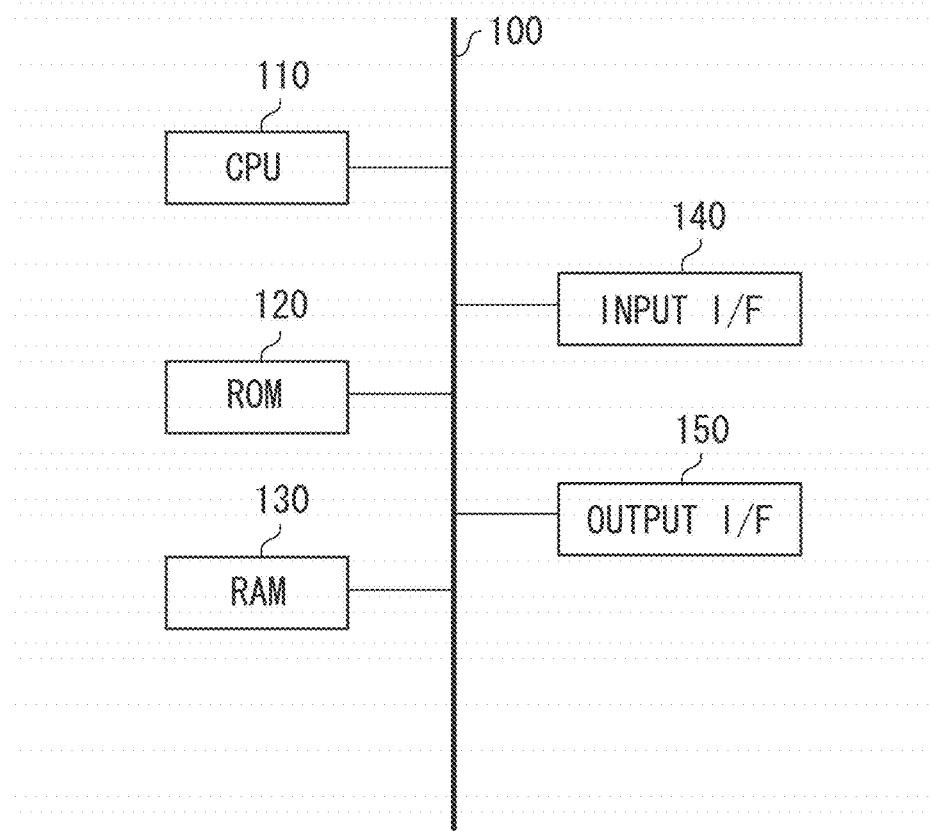
FIG. 1 is a block diagram illustrating a hardware configuration of an information processing apparatus according to the present invention.

FIG. 1 is a diagram illustrating a hardware configuration of an information processing apparatus 200 according to the present invention. In FIG. 1, a central processing unit (CPU) 110 generally controls respective devices connected thereto via a bus 100. The CPU 110 reads and executes a processing step or a program stored in a read only memory (ROM) 120. An operating system (OS), various processing programs according to the present invention, and a device driver are stored in the ROM 120, temporarily stored in a random access memory (RAM) 130, and executed by the CPU 110 as appropriate. Further, an input interface (I/F) 140 receives an input signal from an external device (e.g., a display device or an operation device) in a format processible by the information processing apparatus 200. Further, an output I/F 150 outputs an output signal to the external device (display device) in a format processible by the display device.

First Exemplary Embodiment

In a first exemplary embodiment, description will be given to an exemplary embodiment of the present invention relating to a prior setup of an MR system that superimposes and displays a virtual content on an image of the real world based on a positional attitude of a camera. In the MR system, an image of a scene is captured by a camera mounted on a head-mounted display (hereinafter referred to as "head-mounted display apparatus" or "HMD") (capture of an image), and a corner point is detected from the image as a feature. Then, a positional attitude of the camera is calculated based on the correspondence between the corner points in the images captured chronologically, and a virtual content is superimposed and displayed on the captured image based on the positional attitude of the camera. In the present exemplary embodiment, a method whereby a user observes a scene in which the MR system is used while wearing the HMD, and indicates a feature addition position in the observed scene. The feature addition position is a position preferable for calculating a positional attitude of the camera with high precision, i.e., a position to which a pattern that enables detection of a corner point is to be added.

In the present exemplary embodiment, a distribution of positions of corner points in the image is acquired from the image captured by the user by wearing the HMD as a distribution of features observable by the camera. A positional attitude of the camera can be calculated with higher precision if detection positions of the corner points are uniformly distributed in the image. Therefore, the appropriateness of a distribution of the corner points is evaluated as an evaluation value that represents the uniformity of the distribution of the corner points, a feature addition position is determined so that the evaluation value is improved, and the determined feature addition position is output on a display (display unit) of the HMD. Hereinafter, details of the present exemplary embodiment will be described.

Figure 2:
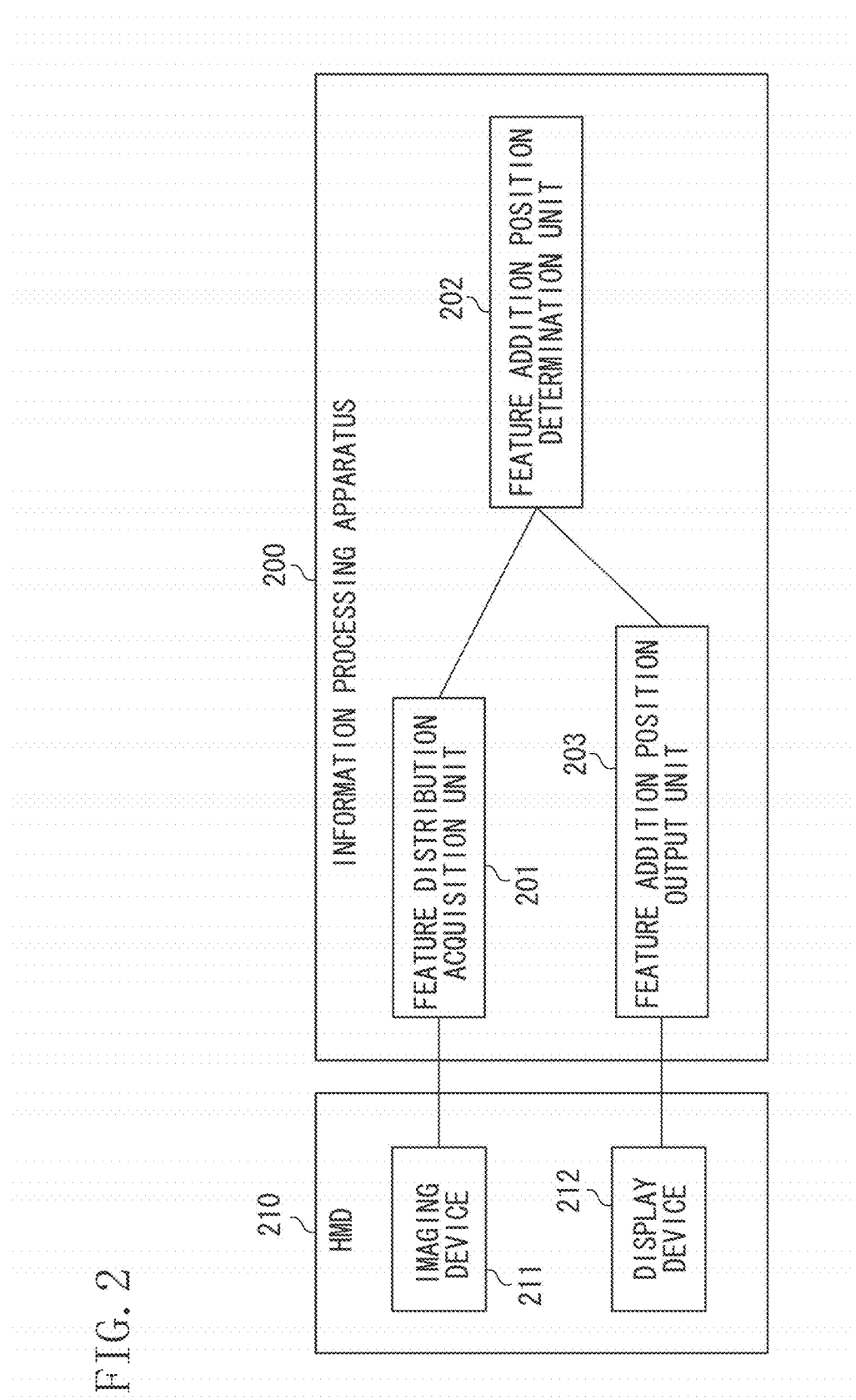
FIG. 2 is a block diagram illustrating a configuration of a processing module of an information processing apparatus according to the present invention.

FIG. 2 is a diagram illustrating connection between a module configuration of the information processing apparatus 200 according to the present exemplary embodiment and an HMD 210 serving as an external device.

A camera capable of capturing an image serving as an imaging device 211 and a liquid crystal display serving as a display device 212 are mounted on the HMD 210.

A feature distribution acquisition unit 201 serves as a module that acquires a distribution of features observable by the camera. The feature distribution acquisition unit 201 acquires a distribution of detection positions by detecting corner points from the image captured by the imaging device 211 of the HMD 210.

A feature addition position determination unit 202 serves as a module that determines a position to which a feature is to be added based on the distribution of features acquired by the feature distribution acquisition unit 201. The feature addition position determination unit 202 calculates a feature addition position that causes an evaluation value for the distribution of features to be improved significantly.

A feature addition position output unit 203 serves as a module that outputs the feature addition position determined by the feature addition position determination unit 202. The feature addition position output unit 203 outputs the feature addition position to the display device 212 of the HMD 210.

The above-described respective function units are realized by the CPU 110 loading a program stored in the ROM 120 to the RAM 130 and executing processing according to respective flowcharts described below. Further, for example, in a case where hardware is configured as an alternative of the software processing using the CPU 110, a calculation unit and a circuit corresponding to the processing of respective function units described in the present exemplary embodiment may be configured.

Next, details of processing according to the present exemplary embodiment will be described with reference to a flowchart illustrated in FIG. 3.

(Step S301)

Figure 4A:
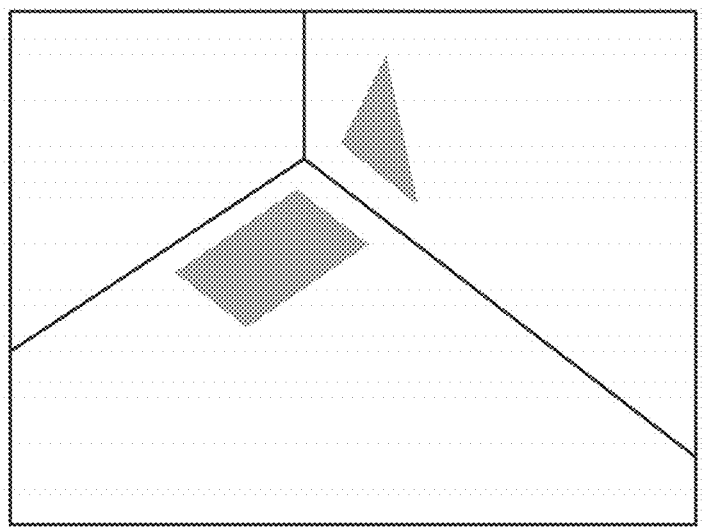
FIG. 4A is a diagram illustrating an example of an acquired image according to the present invention.
Figure 4B:
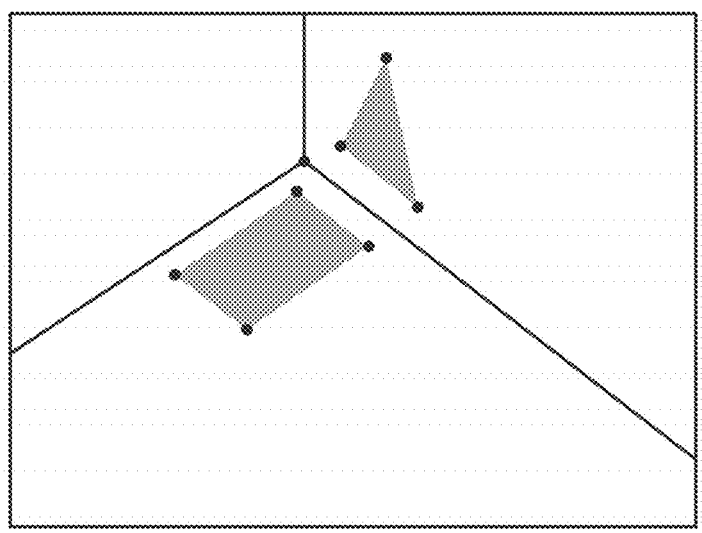
FIG. 4B is a diagram illustrating a result of feature detection according to the present invention.

In step S301, the feature distribution acquisition unit 201 acquires a distribution of features observable by the camera. In the present exemplary embodiment, an image is acquired from the imaging device 211 included in the HMD 210, and a list of coordinate values of corner points which can be acquired by detecting corner point features from the acquired image is specified as the distribution of features observable by the camera. FIG. 4A is a diagram illustrating an example of the acquired image, and FIG. 4B is a diagram illustrating the corner points detected from the acquired image. The detected corner points are expressed by black dots in FIG. 4B. Although various methods are provided as the methods for detecting the corner points, in the present exemplary embodiment, a corner point detection method discussed in the non-patent literature 1 (NPL 1) is employed.

(Step S302)

In step S302, based on the distribution of features, specifically the distribution of positions of the corner points in the image, the feature addition position determination unit 202 determines a feature addition position. Details of the processing executed in step S302 will be described below with reference to FIG. 5.

(Step S303)

Figure 6:
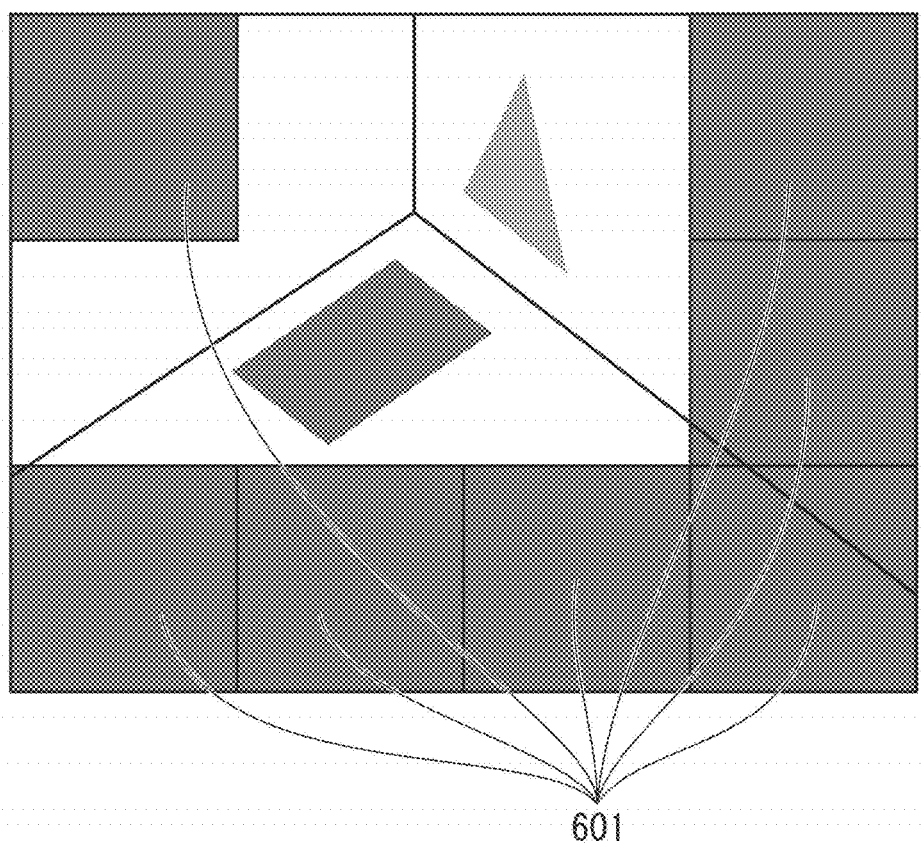
FIG. 6 is a diagram illustrating an example of a screen for indicating a feature addition position according to the present invention.

In step S303, the feature addition position output unit 203 generates an image illustrating the feature addition position determined in step S302, specifically an image in which a semi-transparent color is applied onto a rectangular region corresponding to the feature addition position calculated in step S302, and outputs the image to the display device 212 of the HMD 210. The HMD 210 superimposes the image that illustrates the feature addition position onto the image captured by the imaging device 211, and outputs the resultant image to the display device 212, thereby indicating the feature addition position. FIG. 6 is a diagram illustrating an example of a screen for indicating the feature addition positions when the image illustrated in FIG. 4A is captured by the imaging device 211. A position to which the feature is to be added is indicated by each of colored divided regions 601. For example, the position to which the feature is to be added may be indicated by a figure such as a circle or a balloon that surrounds a region or an arrow instead of the colored divided region. Further, in a case where no position to which the feature is to be added is determined in step S302, the HMD 210 may display information indicating that calculation quality of the camera positional attitude is sufficiently high even without adding a feature.

Next, the processing executed in step S302 will be described with reference to the flowchart illustrated in FIG. 5.

(Step S501)

In step S501, the feature addition position determination unit 202 calculates and saves an evaluation value for evaluating appropriateness of the distribution of features acquired in step S301. The evaluation value is a value that represents the uniformity of a distribution of positions of corner points in an image, and can be calculated with respect to an optional distribution of features through the following procedure. More specifically, the image is divided into rectangular regions of a predetermined size which do not overlap with each other, and a value "1" is added to the evaluation value if one or more corner points are included in one of the divided rectangular regions, so that the acquired sum is assigned as the evaluation value. In other words, the number of corner points is counted for each of the rectangular regions, and the evaluation value is increased by "1" if the number of corner points included in one rectangular region is one or more. Regarding the size of the rectangular region, the smaller the size is, the more accurately the distribution of features can be evaluated. However, the size needs to be at least such a size as to allow the corner points to be detected. It is not preferable to divide the image into too many rectangular regions since calculation load increases. Meanwhile, if the size of the rectangular region is too large with respect to the entire image, the number of the rectangular regions becomes too small (e.g. 5 or less), so that the precision of the camera positional attitude calculation becomes unstable. Thus, the size of the rectangular region may be determined in consideration of the aforementioned matters.

(Step S502)

In step S502, the feature addition position determination unit 202 generates a plurality of positions to which the features can be added as feature addition position candidates. More specifically, similar to step S501, the image is divided into a predetermined number of rectangular regions that do not overlap with each other, and the center of each rectangular region is saved as a feature addition position candidate.

(Step S503)

In step S503, the feature addition position determination unit 202 executes loop processing to each of the feature addition position candidates generated in step S502.

(Step S504)

In step S504, similar to the processing executed in step S501, the feature addition position determination unit 202 calculates and saves an evaluation value for a distribution of features that is acquired when a feature is added to each of the feature addition position candidates of the distribution of features acquired in step S301.

(Step S505)

In step S505, from among the feature addition position candidates generated in step S502, the feature addition position determination unit 202 takes out a feature addition position candidate having an improvement amount of the evaluation value (i.e., an increase in the evaluation value calculated in step S504 from the evaluation value calculated in step S501) equal to or greater than a predetermined value when the feature is added to the feature addition position candidate. When the evaluation value is calculated by the method described in step S501 of the present exemplary embodiment, the improvement amount of the evaluation value is either "0" or "1". Herein, the above-described predetermined value is set as "1" and a feature addition position candidate having the improvement amount of the evaluation value "1" is taken out.

Description has been given to a method for determining the position to which the feature is to be added in order to enable highly-precise calculation of the camera positional attitude and indicating the position to the user. Through the method, the user can know a position to which the feature is to be added without a process of trial-and-error, and thus the time required for a setting operation of the features can be shortened.

Second Exemplary Embodiment

In the first exemplary embodiment, a feature addition position is determined by acquiring a distribution of two-dimensional positions in the image as the distribution of features. In a second exemplary embodiment, a feature addition position is determined by acquiring a distribution of three-dimensional positions of features. The present exemplary embodiment is different from the first exemplary embodiment in a calculation method of the distribution of features and a determination method of the feature addition position. In the present exemplary embodiment, the HMD 210 further includes a three-dimensional information measurement device, so that three-dimensional position information of a corner point detected from the image acquired from the imaging device 211 is acquired. Then, an evaluation value that represents the uniformity of a distribution of three-dimensional positions of corner points is calculated, and a feature addition position that improves the evaluation value is determined. Hereinafter, details of the processing according to the present exemplary embodiment will be described.

Figure 7:
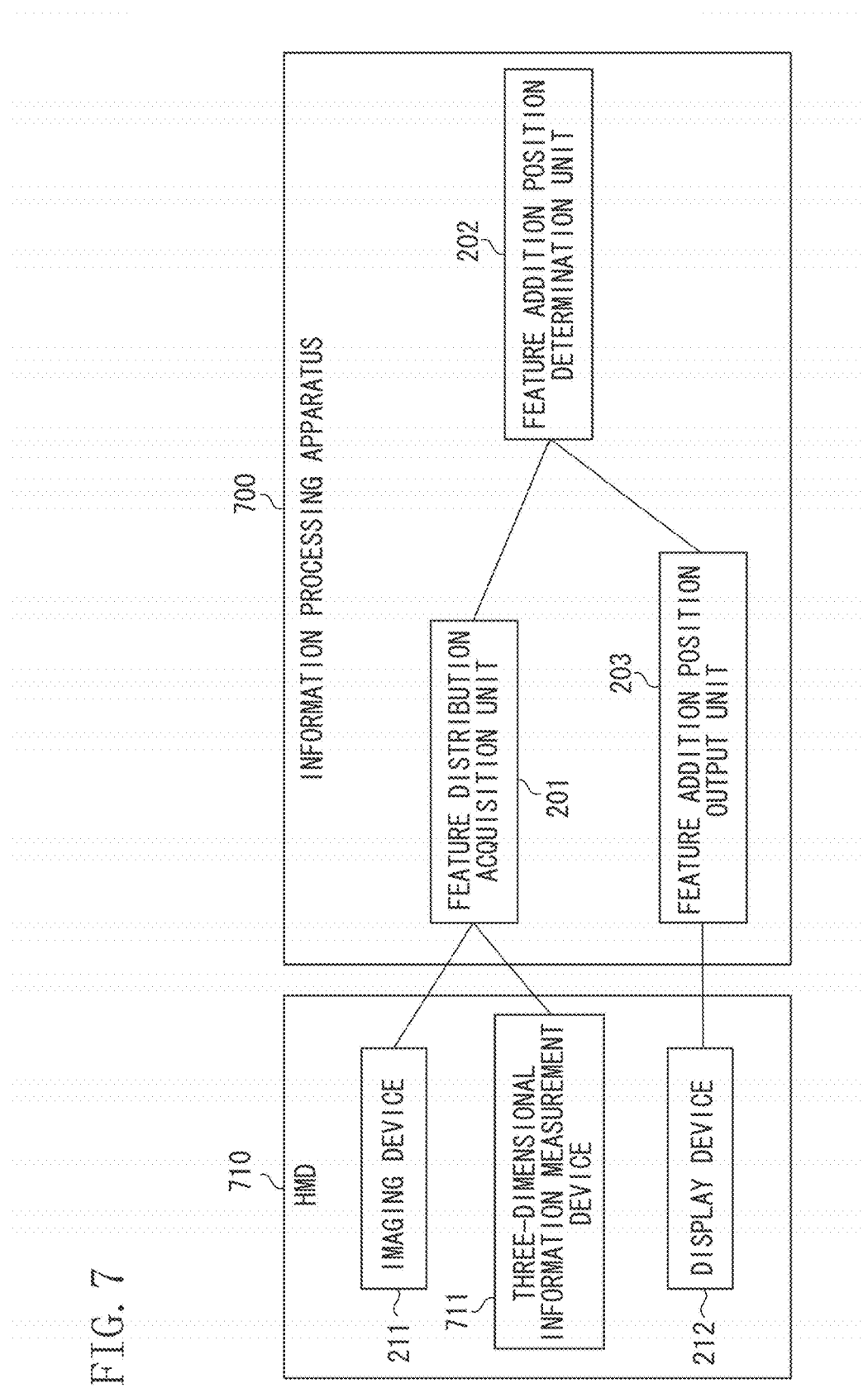
FIG. 7 is a block diagram illustrating a configuration of a processing module of an information processing apparatus according to the present invention.

FIG. 7 is a diagram illustrating connection between a module configuration of an information processing apparatus 700 according to the present exemplary embodiment and an HMD 710 serving as an external device. In the present exemplary embodiment, a three-dimensional information measurement device 711 is added to the configuration of the HMD 210 described in the first exemplary embodiment. The three-dimensional information measurement device 711 internally includes a device that projects infrared light of a predetermined pattern and a device that captures an infrared image, and measures a distance value of each pixel of the image captured by the imaging device 211 of the HMD 710 by an active stereo method.

Details of processing according to the present exemplary embodiment will be described with reference to the flowchart illustrated in FIG. 3.

(Step S301)

In step S301, the feature distribution acquisition unit 201 acquires a distribution of features observable by the HMD 710 worn by the user. In the present exemplary embodiment, the feature distribution acquisition unit 201 acquires a distribution of three-dimensional positions of corner points observed by the HMD 710. More specifically, an image is acquired from the imaging device 211 included in the HMD 710, and a corner point is acquired from the image. Then, a distance value of a pixel of the detected corner point feature is acquired from the three-dimensional information measurement device 711, thereby calculating a three-dimensional position of the corner point viewed from the imaging device 211.

(Step S302)

In step S302, based on the distribution of features, specifically the distribution of three-dimensional positions of the corner points viewed from the imaging device 211, the feature addition position determination unit 202 determines a feature addition position. Details of the processing executed in step S302 will be described below with reference to FIG. 5.

(Step S303)

In step S303, the feature addition position output unit 203 indicates the feature addition position determined in step S302 by generating an image illustrating the feature addition position determined in step S302 and outputting the image to the display device 212 of the HMD 710. More specifically, the feature addition position is indicated by a method similar to the method described in the first exemplary embodiment.

Next, the processing executed in step S302 will be described with reference to the flowchart illustrated in FIG. 5.

(Step S501)

In step S501, an evaluation value for evaluating the appropriateness of the distribution of features acquired in step S301 is calculated and saved. The evaluation value is a value that represents the uniformity of a distribution of three-dimensional positions of corner points in the image, and can be calculated with respect to the optional distribution of features through the following procedure.

Specifically, voxel spaces are generated by dividing a space observable by the imaging device 211. A range in which the voxel spaces are generated corresponds to a range in which the features that are used for the calculation of the camera positional attitude in the MR system may exist. A value "1" is added to the evaluation value if one or more corner points are included in each of the voxel spaces, and the acquired sum is assigned as the evaluation value.

(Step S502)

In step S502, the feature addition position determination unit 202 generates a plurality of positions to which the features can be added as feature addition position candidates. Specifically, an image is divided into rectangular regions of predetermined sizes which do not overlap with each other. Then, three-dimensional positions of pixels belonging to each of the rectangular regions are acquired from the three-dimensional information measurement device 711, and a three-dimensional position is calculated by taking an average thereof. From among the calculated three-dimensional positions, a three-dimensional position a distance of which viewed from the imaging device 211 falls within a predetermined range is saved as a feature addition position candidate. The image may be divided into the rectangular regions in a manner similar to that in the first exemplary embodiment.

(Step S503)

In step S503, the feature addition position determination unit 202 starts executing loop processing to each of the feature addition position candidates generated in step S502.

(Step S504)

In step S504, similar to the processing in step S501, the feature addition position determination unit 202 calculates and saves an evaluation value for a distribution when the feature is added to each of the feature addition position candidates with respect to the distribution of features acquired in step S301.

(Step S505)

In step S505, from among the feature addition position candidates generated in step S502, the feature addition position determination unit 202 takes out a feature addition position candidate having an improvement amount of the evaluation value (i.e., an increase in the evaluation value calculated in step S504 from the evaluation value calculated in step S501) equal to or greater than a predetermined value when the feature is added to each of the feature addition position candidates. In a case where the evaluation value is calculated by the method described in step S501 of the present exemplary embodiment, the improvement amount (i.e., increased amount) of the evaluation value is either "0" or "1". Herein, a feature addition position candidate having the improvement amount of the evaluation value "1" is taken out by setting the above-described predetermined value as "1".

Description has been given to a method for determining the position to which the feature is to be added in order to enable highly-precise calculation of the camera positional attitude. As described above, by taking a three-dimensional distribution of features into consideration, it is possible to determine the position to which the feature is to be added in order to enable highly-precise calculation of the camera positional attitude more precisely.

Modification Example 2-1

(Define an Evaluation Value in which the Number of Distributed Features is Taken into Consideration in Addition to the Uniformity of Distribution.)

In the second exemplary embodiment, when the camera positional attitude is to be calculated by using the corner point feature in step S302, a distribution of corner points in which positions of the corner points are uniformly distributed in a space is regarded as a preferable distribution of corner points. However, a distribution of corner points in which positions of the corner points are distributed in a space uniformly and numerously may be regarded as the preferable distribution of corner points. In a case where the camera positional attitude is to be calculated, one feature distribution having the number of distributed features greater than that of another feature distribution is less likely to be influenced by a random error arising in a distance between the corresponding points if the evaluation value for the one feature distribution which represents the uniformity of distribution, which is defined in the second exemplary embodiment, is the same as that of another feature distribution. Therefore, the feature addition position can be determined more appropriately if the number of distributed features is also taken into consideration.

In the present modification example, an evaluation value "e" that represents the uniformity of distribution and the numerousness of distributed features is defined as follows.

[Math. 1]

$$e = \Sigma_{r \in R}(1 - \alpha^{-\beta c_r})$$ Formula 1

Herein, symbols "r", "R", and "$c_r$" respectively represent each voxel, a class of all of the voxels, and the number of corner points included in each voxel "r", whereas symbols "α" and "β" are parameters of positive real numbers which determine a balance between an influence of an extent of the distribution of features and an influence of the number of distributed features with respect to precision of the camera positional attitude. Definition of the evaluation value used in step S501 of the second exemplary embodiment will be replaced with definition of the evaluation value described as the above.

In addition, the above evaluation value is similarly applicable to the first exemplary embodiment. In such a case, the uniformity of positions of the corner points in the image is evaluated by assigning each of the rectangular regions generated in step S502 of the first exemplary embodiment as "r" whereas a class of all of the rectangular regions generated in step S502 of the first exemplary embodiment as "R".

As described above, it is possible to determine the position to which the feature is to be added in order to enable highly-precise calculation of the camera positional attitude more precisely when the numerousness of distributed features is taken into consideration in addition to the uniformity of distribution of features.

Modification Example 2-2

(Determine a Feature Addition Position Also in Consideration of Uniformity of a Distribution of Orientations.)

Although a distribution of features is evaluated based on a distribution of three-dimensional positions of features in the second exemplary embodiment, an addition position and an addition orientation of the feature may be determined and indicated also in consideration of a distribution of orientations of features. In a present modification example 2-2, in the apparatus configuration described in the second exemplary embodiment, description will be given to a method for calculating a normal line direction of a plane in which the feature exists as an orientation of the feature and determining an addition position and an orientation of the feature so that a distribution of three-dimensional positions of the features and a distribution of orientations of the features become uniform. The processing content different from the processing content described above will be described.

(Step S301)

In step S301, the feature distribution acquisition unit 201 acquires a distribution of the features observable by the imaging device 211 in a scene in which the MR system is used. More specifically, the feature distribution acquisition unit 201 acquires a distribution of three-dimensional positions of the corner points and a distribution of orientations of the corner points. A distance value of a pixel of a detected corner point is acquired from the three-dimensional information measurement device 711, and a three-dimensional position of that corner point is calculated. A normal line direction of a plane that is calculated from a distance value of the proximal pixel of the detected corner point acquired from the three-dimensional information measurement device 711 is assigned as the orientation of the corner point.

(Step S302)

In step S302, the feature addition position determination unit 202 determines the feature addition position and the orientation so that the distribution of three-dimensional positions of the corner points and the distribution of orientations of the corner points become uniform.

First, the feature addition position candidates taken out through the processing up to step S505 in the second exemplary embodiment are saved as feature addition candidates based on the positions of the features, and these feature addition candidates are further evaluated based on the orientations of the features. First, with respect to each of the feature addition candidates based on the feature positions, an orientation of the feature addition position is calculated from a distance value of the proximal pixel through a method similar to the method described in step S301. Next, an evaluation value for the uniformity of distribution of orientations of the corner points when a corner point is added to each of the feature addition candidates is calculated. Specifically, intersections of straight lines, each of which extends in the orientation of the feature calculated and observed in step S301 or in the orientation of the feature addition candidate, each of which makes the origin as a starting point, and a unit sphere are respectively calculated as three-dimensional coordinate values, and contribution rates of three axes are calculated by executing principal component analysis with respect to all of the calculated three-dimensional coordinate values. Of the above contribution rates, a value that is acquired by dividing a value of the minimum contribution rate by a value of the maximum contribution rate is assigned as the evaluation value. The orientations of the corner points are distributed more uniformly when this evaluation value is greater. With respect to the feature addition candidates calculated based on the positions of the features, the evaluation value representing the uniformity of the orientations of the features is calculated through the above-described method, and the feature addition candidate having a high evaluation value of the orientation of the feature is taken out.

In addition, in the present modification example, although description is given to a method in which orientations of the features are further evaluated after evaluating a distribution of positions of the features through the processing up to step S504 in the second exemplary embodiment, the orientations of the features may be firstly evaluated before evaluating the distribution of positions of the features. Further, a sum of the evaluation value for a distribution of the features and the evaluation value for a distribution of the orientations of the features weighted with a predetermined value may be simultaneously evaluated as the evaluation value, or evaluation may be executed only with the orientation of the features. When the evaluation is to be executed only with the orientations of the features, a plurality of directional vectors that indicate the points generated by sampling the sphere face from the origin of the unit sphere with predetermined numbers is used as the candidates of the feature addition orientation. With respect to each of the feature addition orientation candidates, the evaluation value for uniformity of the orientation of the feature when a feature is added to that orientation is calculated, and the feature addition orientation candidate having the high evaluation value is taken out.

A determination method of the feature addition position that causes both of the distribution of positions of the features and the distribution of orientations of the features become uniform has been described as the above. Through the method, it is possible to determine the position to which the feature is to be added in order to enable highly-precise calculation of the camera positional attitude more precisely.

Third Exemplary Embodiment (Assign an Extent of a Distribution Range as an Evaluation Value.)

In the first exemplary embodiment, the feature addition position is determined so that the distribution of positions of the corner points or the distribution of orientations of the corner points becomes uniform in step S302. However, in a third exemplary embodiment, the feature addition position is determined so that the positions or the orientations of the corner points are extensively distributed in the image. This is because the camera positional attitude can be calculated more precisely if the positions or the orientations of the corner points are distributed extensively rather than to be distributed intensively. From the above viewpoint, in the present exemplary embodiment, appropriateness of the distribution of the corner points is evaluated with an evaluation value that represents an extent of a distribution range of the corner points. More specifically, the evaluation value for evaluating the appropriateness of the distribution of the features described in step S501 in the first exemplary embodiment is defined as a variance of two-dimensional positions of the corner points in the image.

When the evaluation value described in the present exemplary embodiment is to be used, an improvement amount (increased amount) of the evaluation value calculated in step S505 takes a continuous value, although the improvement amount in the first or the second exemplary embodiment takes a discrete value of 0 or 1. Therefore, as described in the first exemplary embodiment, when the feature addition position is indicated to the user through a screen illustrated in FIG. 6, an improvement amount (or an order of the improvement amounts) of the evaluation value when the feature is added to the feature addition position is further displayed on a region 601 that represents the feature addition position. With this method, the user can also find out importance of the feature addition position candidate.

Although a method for determining the feature addition position based on the extent of the distribution range of the positions of the features in the image is described in the present exemplary embodiment, a three-dimensional position for adding the feature may be determined based on the extent of a distribution of the three-dimensional positions of the features in a space. Specifically, the evaluation value for evaluating appropriateness of the distribution of the features described in step S501 in the second exemplary embodiment is defined as a variance of the three-dimensional positions of the corner points in the image. Further, an orientation to which the feature is to be added may be determined based on the extent of a distribution of the orientations of the features in the space. Specifically, the evaluation value for evaluating appropriateness of the distribution of the orientations of the features described in the modification example 2-2 is defined as a variance of the orientations of the features. Herein, with respect to the variance of orientations, an orientation of each distributed feature is converted into a unit vector that indicates a hemisphere face having a radius of "1", and the variance is assigned as "1-R" by setting a value acquired by dividing a magnitude of a sum vector of all of the unit vectors by the number of elements as "R".

A method for determining the feature addition position based on the extent of the distribution range of the features has been described as the above. With this method, the feature addition position can be indicated so that the distribution range becomes wider.

Fourth Exemplary Embodiment

Precision calculated from three-dimensional error propagation is assigned as an evaluation value.

In the first to the third exemplary embodiments, a distribution of positions or orientations of features in the image or the three-dimensional space is acquired as the distribution of features, and the evaluation value that represents appropriateness of the distribution of features used for the calculation of the camera positional attitude is defined based on the uniformity of the distribution or the extent of the distribution range.

In a fourth exemplary embodiment, calculation precision of a positional attitude when the camera positional attitude is calculated in the current distribution of features is defined as the evaluation value, and a feature addition position is determined so that the evaluation value is improved. More specifically, a distribution of three-dimensional positions of features and a distribution of precisions of detection positions in an image is acquired. Then, based on the distribution of positions of the features and the distribution of precisions of the detection positions, calculation precision when the camera positional attitude is calculated (derived) is calculated and assigned as the evaluation value for the current distribution of features, and the feature addition position that causes this evaluation value to be improved is determined. Hereinafter, of the processing content of the present exemplary embodiment executed in the apparatus configuration similar to that of the second exemplary embodiment, processing content different from the processing content described in the above-described exemplary embodiments will be described with reference to the flowchart illustrated in FIG. 3.

(Step S301)

In step S301, the feature distribution acquisition unit 201 acquires the distribution of features observable by the imaging device 211 of the HMD worn by the user, specifically, a distribution of the covariance matrix that represents three-dimensional positions of the corner points and detection precisions thereof. The three-dimensional positions of the corner points are acquired by a method similar to the method described in the second exemplary embodiment. With respect to the covariance matrix that represents the detection precisions of the corner points, a maximum error 0.5 px of a detection position of each corner point in the image caused by a quantization error of the image is approximated by the Gaussian distribution having a standard deviation of "$3\sigma$", and a variance "$\sigma^2$" is included as a diagonal component thereof. When a factor other than the quantization error is to be considered as a factor of the maximum error of the detection position, variation in the detection position may be calculated by detecting the feature from a plurality of images captured by the imaging device 211 in a static state.

(Step S302)

In step S302, the feature addition position determination unit 202 determines a feature addition position based on the distribution of features such as a distribution of the covariance matrix that represents three-dimensional positions of the corner points and detection precisions thereof. Details of the processing content in step S302 will be described below.

(Step S303)

In step S303, the feature addition position output unit 203 generates an image illustrating the feature addition position determined in step S302 and outputs the image onto the display device 212 of the HMD. Specifically, the feature addition position is indicated by a method similar to the method described in the second exemplary embodiment.

Next, the processing content in step S302 will be described with reference to the flowchart illustrated in FIG. 5.

(Step S501)

In step S501, the evaluation value for evaluating appropriateness of the distribution of features acquired in step S301 is calculated and saved. The evaluation value is a value that represents the calculation precision when the camera positional attitude is calculated based on the covariance matrix representing the three-dimensional positions of the corner points and detection precisions thereof, and can be calculated with respect to the optional distribution of features through the following procedure. In other words, a covariance matrix "S" that represents calculation precision of the camera positional attitude calculated by the following formula 2 is assigned as the evaluation value.

[Math. 2]

$$s = J^+ \begin{bmatrix} \sigma_{1x}^2 & & & & 0 \\ & \sigma_{1y}^2 & & & \\ & & \ddots & & \\ & & & \sigma_{Nx}^2 & \\ 0 & & & & \sigma_{Ny}^2 \end{bmatrix} (J^+)^T \quad \text{Formula 2}$$

Herein, a symbol "N" represents a total number of the corner points.

$\sigma_{nx}^2, \sigma_{ny}^2$ [Math. 3]

Respective variances illustrated in [Math. 3] represent variances of an x-axis component and a y-axis component of the n-th corner point. A symbol "J+" represents a pseudo inverse matrix of a Jacobian matrix "J". The Jacobian matrix "J" of the camera positional attitude is a coefficient matrix that is acquired by partially differentiating a position of each corner point observed in the image by six parameters of translational movement and rotation representing the camera positional attitude.

(Step S502)

In step S502, a plurality of positions to which the features can be added is generated as feature addition position candidates (generation of a plurality of feature addition position candidates). Specifically, the image is divided into rectangular regions of predetermined sizes which do not overlap with each other. Then, three-dimensional positions of the pixels belonging to each of the rectangular regions are acquired from the three-dimensional information measurement device 711, and a three-dimensional position is calculated by taking an average thereof. From among the calculated three-dimensional positions, a three-dimensional position a distance of which viewed from the imaging device 211 falls within a predetermined range is saved as a feature addition position candidate.

(Step S503)

In step S503, loop processing is executed to each of the feature addition position candidates generated in step S502.

(Step S504)

In step S504, with respect to the distribution when the feature is added to each of the feature addition position candidates of the distribution of features acquired in step S301, the evaluation value is calculated and saved through a method similar to the method in step S501.

(Step S505)

In step S505, from among the feature addition position candidates generated in step S502, a feature addition position candidate having an improvement amount of the evaluation value equal to or greater than a predetermined value when the feature is added to the feature addition position candidate is taken out. In the present exemplary embodiment, the improvement amount is calculated by acquiring a scalar value from the covariance matrix that represents calculation precision of the camera positional attitude regarded as the evaluation value through the following calculation. First, the covariance matrix "S" that represents calculation precision of the camera positional attitude is converted to a covariance matrix of a drawing position when a virtual reference point existing in a predetermined position is superimposed onto the image captured by the imaging device 211 based on the calculated camera positional attitude. Next, a square root of the maximum eigenvalue of the converted covariance matrix is calculated, and a difference in values between before and after adding the feature is acquired as the improvement amount of the evaluation value.

Description has been given to a method for determining the feature addition position so that the calculation precision of the camera positional attitude calculated based on the distribution of three-dimensional positions and detection precisions of the features observable by the imaging device 211 is improved. Through the method, it is possible to determine a position to which the feature is to be added in order to enable highly-precise calculation of the camera positional attitude more precisely.

Fifth Exemplary Embodiment

In the first to the fourth exemplary embodiments, when the feature addition position is determined based on the evaluation value for the distribution of features in step S302, a feature addition position having an improvement amount of the evaluation value greater than a predetermined value is taken out. In the present exemplary embodiment, as other take-out references, description will be given to a method for taking out a predetermined number of feature addition positions having large improvement amounts of evaluation values from the highest order from among the feature addition position candidates, and a method for separately acquiring a target evaluation value and taking out the feature addition positions necessary to achieve the target evaluation value with addition of features of small numbers from the feature addition position candidates.

(Take Out and Indicate a Predetermined Number of Feature Addition Positions Having Large Improvement Amounts of Evaluation Values from the Highest Order from Among the Feature Addition Position Candidates.)

The feature addition position candidates are sorted with the evaluation values calculated for the feature addition position candidates, and a predetermined number of feature addition position candidates is taken out and indicated from the highest order. A value input by the user may be used as the predetermined number from the highest order.

(Set a Target Evaluation Value Separately, and Take Out Feature Addition Positions Necessary to Achieve the Target Evaluation Value with Addition of Features of Small Numbers from the Feature Addition Position Candidates.)

A predetermined target evaluation value is set while the feature addition positions necessary to satisfy the target evaluation value with addition of features of small numbers is taken out if the target evaluation value is not satisfied with the current distribution of features.

Figure 8:
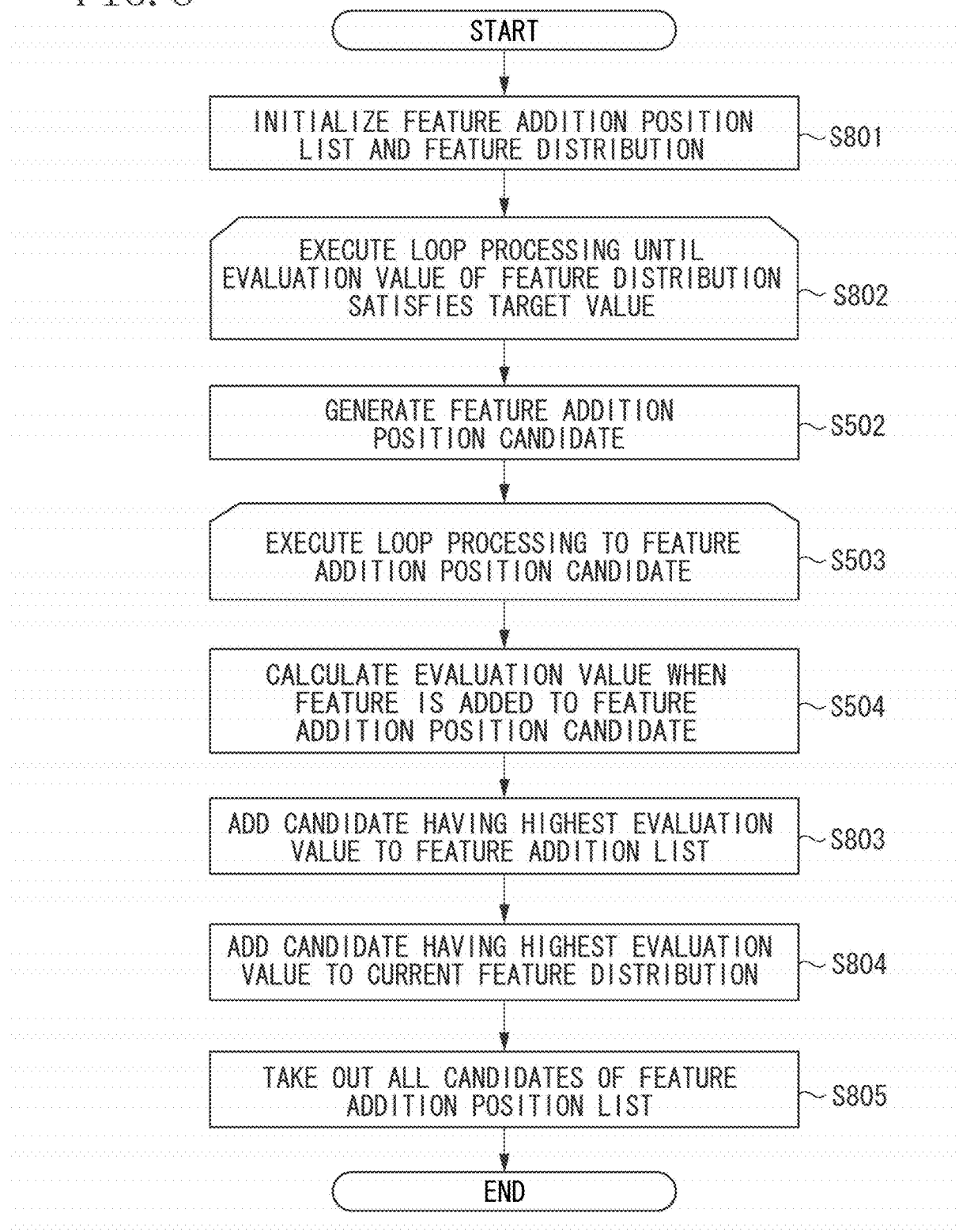
FIG. 8 is a flowchart illustrating a determination method of a feature addition position according to the present invention.

In this method, a target evaluation value previously input by the user via a user interface (UI) is acquired. Then, the feature addition position is determined by changing the processing content in step S302 to the flowchart illustrated in FIG. 8 described below. Hereinafter, the processing content will be described with reference to the flowchart illustrated in FIG. 8.

Step S801

In step S801, a feature addition position list for saving a plurality of feature addition positions is initialized with an empty list, and the feature distribution is initialized with the distribution of features acquired in step S301.

Step S802

In step S802, loop processing in which an evaluation value for the feature distribution in the current feature distribution acquired in step S301 is calculated repeatedly until the evaluation value satisfies the target evaluation value is executed. The evaluation value is calculated through the method described in step S501 of the given exemplary embodiment described above.

(Step S502)

In step S502, a plurality of positions to which features can be added is generated as feature addition position candidates. A specific method is similar to the method in step S502 in FIG. 5 of the above-described respective exemplary embodiments.

(Step S503)

In step S503, loop processing is executed to each of the feature addition position candidates generated in step S502.

(Step S504)

In step S504, with respect to the distribution when the feature is added to each of the feature addition position candidates of the current feature distribution, an evaluation value is calculated and saved through a method similar to the method in step S501 described in each of the above-described exemplary embodiments.

Step S803

In step S803, a feature addition position candidate having the highest evaluation value is taken out from among the feature addition position candidates and added to the feature addition position list.

Step S804

In step S804, the feature addition position candidate having the highest evaluation value added in step S803 is added to the current feature distribution.

Step S805

In step S805, all of the feature addition position candidates listed in the feature addition position list is taken out as the feature addition positions to be indicated in step S303.

Figure 9A:
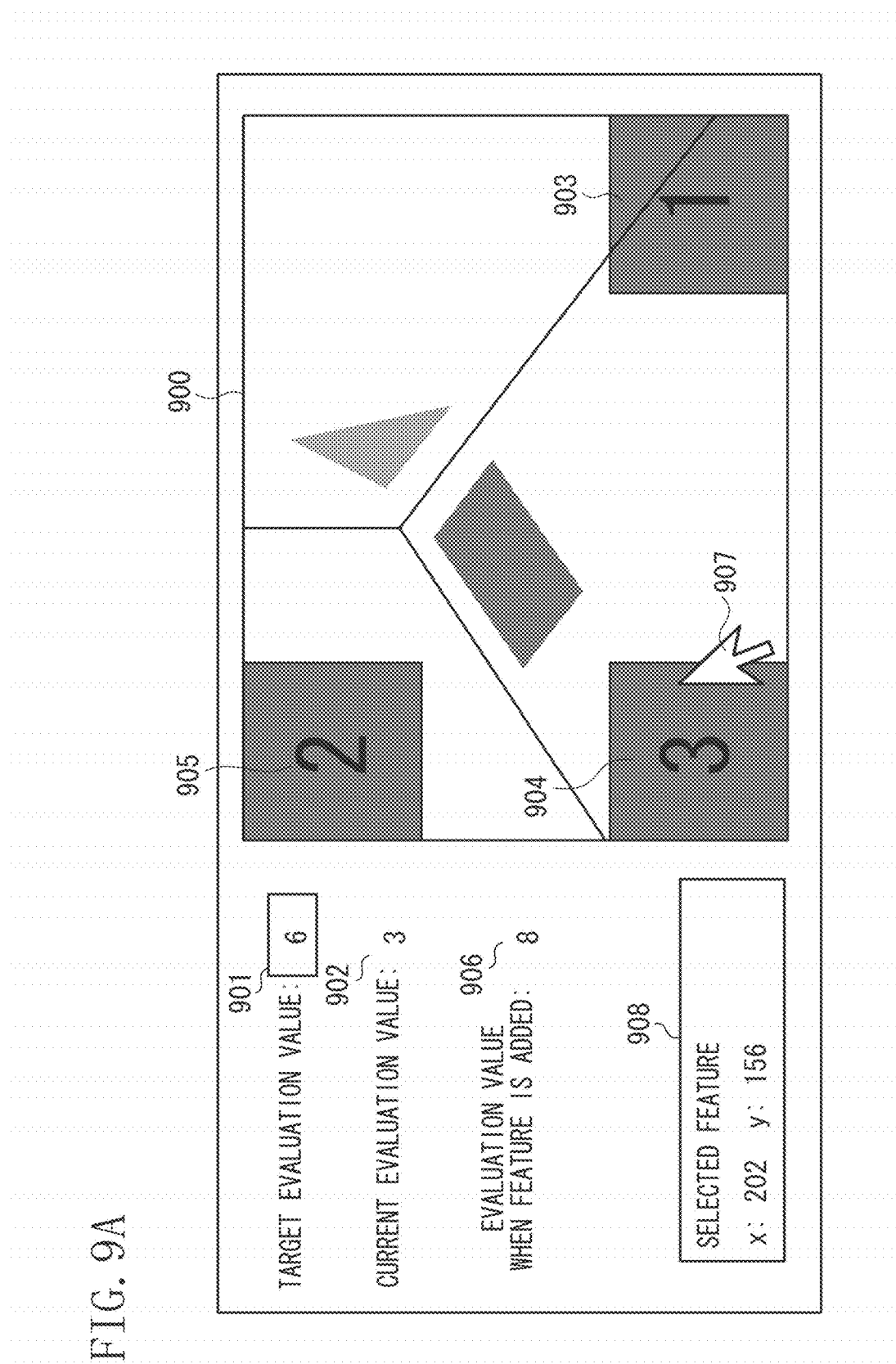
FIG. 9A is a diagram illustrating an example of a screen for indicating a feature addition position according to the present invention.

FIG. 9A is a diagram illustrating an example of a screen for indicating the feature addition position to the user when the feature addition position is determined by the above-described method. An image captured by the imaging device 211 on which the feature addition position is superimposed is displayed on a region 900. A target evaluation value set by the user is displayed on a region 901. An evaluation value calculated with respect to the distribution of features observed by the imaging device 211 of the HMD is displayed on a region 902. Regions 903 to 905 represent feature addition positions for achieving the target evaluation value, and numerical values displayed within the regions 903 to 905 represent an order in which the feature addition positions are added to the feature addition list in step S803. A smaller numerical value represents a feature addition position that is more effective in improving the evaluation value. Further, when the evaluation value is already greater than the target value and thus the user does not have to add the feature, a message indicating such a state is displayed on the screen.

In addition, a numerical values displayed on each of the regions 903 to 905 may be the evaluation value itself, or may be the improvement amount with respect to the evaluation value before adding the feature if the feature is to be added thereto. Further, a display method using color or transparency may be used instead of using a numerical value. An evaluation value when the features are added to the indicated regions 903 to 905 is displayed on the region 906. Attribute information will be displayed on a region 908 when each of the regions 903 to 905 is selected with a mouse cursor 907.

In the present exemplary embodiment, the user has directly set the target evaluation value with a numerical value. However, in order to allow the user to easily determine the target evaluation value, the user may input the number of pixels representing an allowable vibration amount of a computer graphic (CG) content drawn by the MR system and a distance at which the user has approached the CG content the most, so that the input values may be converted to the calculation precision of the camera positional attitude regarded as the evaluation value defined in the fourth exemplary embodiment. Further, the UI that allows the user to adjust the vibration amount by checking the state where the CG content vibrates with the vibration amount of that moment may be provided. With this configuration, the user can set the evaluation value through an intuitively-understandable method.

In the present exemplary embodiment, although the user has set the target evaluation value, a predetermined target evaluation value may be saved previously, and that value may be acquired instead of asking the user to set the target evaluation value. That predetermined target evaluation value may be assigned as a target evaluation value for calculating the camera positional attitude without failure.

In the present exemplary embodiment, the feature addition position candidates are added to the feature addition position list in the order of evaluation value from the feature addition position candidate having the highest evaluation value in step S804. However, the method thereof is not limited thereto. For example, a predetermined number of features may be collectively added to the feature addition position list in the order of the higher evaluation values.

Through the above-described methods, it is possible to indicate the feature addition positions necessary to achieve a desired target value with small addition amounts.

Sixth Exemplary Embodiment (A Variation of an Acquisition Method of Distribution. Acquire a Distribution from an Image Generated from Three-Dimensional Information Instead of an Actually-Observed Image.)

Although a distribution of the features is acquired from the observed image captured by the HMD in step S301 in the first to the fifth exemplary embodiments, in a sixth exemplary embodiment, a distribution of the features is acquired from an image that is generated based on three-dimensional information of a scene and a camera positional attitude. The processing executed in step S301 according to the present exemplary embodiment will be described.

First, three-dimensional information of the scene used in the MR system is acquired. Specifically, the scene is thoroughly scanned with a red-green-blue/depth (RGB-D) scanner, and distance information associated with color information of the scene is acquired. Next, a camera positional attitude corresponding to a viewpoint at which the user would like to check the feature addition position set thereto is acquired. The three-dimensional information of the scene is projected onto the image face observed in the acquired camera positional attitude, so that an image that is supposed to be acquired when the scene is actually observed in the set camera positional attitude is generated. Then, a distribution of corner points is acquired by detecting the corner points from that image.

In the present exemplary embodiment, the three-dimensional information of the scene is acquired through scanning. However, the scanning is not always necessary if it is possible to acquire the three-dimensional information of the scene for generating the image that is supposed to be observed at the viewpoint at which the user would like to check the feature addition position. For example, a three-dimensional model of the scene created by the user through three-dimensional (3D) modeling software may be used.

Description has been given to a method for acquiring the distribution of features from the image generated from the three-dimensional information of the scene and the camera positional attitude. With this method, an addition position of a feature can be determined and indicated at an optional camera positional attitude in which the user would like to check the feature addition position.

Seventh Exemplary Embodiment

In the first to the sixth exemplary embodiments, the position to which the feature is to be added is determined and indicated in a single camera viewpoint. In a seventh exemplary embodiment, description will be given a method in which the position to which the feature is to be added is determined and indicated in a plurality of camera viewpoints that can be taken by the HMD in a scene in which the MR system is to be used.

In the present exemplary embodiment, similar to the first to the fifth exemplary embodiments, details will be described with respect to an exemplary embodiment in which the three-dimensional information of the scene in which the MR system is used is not acquired. The user actually walks about the scene and specifies a range of the positional attitude that can be taken by the HMD, and the feature addition positions are determined at a plurality of specified viewpoints through any of the methods described in the first to the fifth exemplary embodiments accordingly. Images indicating the determined feature addition position acquired in step S303 may be instantly indicated on the display device 212 of the HMD while the user is walking about the scene, or may be collectively indicated thereon so that the user can look through the images after walking about the scene.

Description has been given to a method for determining and indicating the position to which the feature is to be added in a plurality of camera viewpoints that can be taken by the HMD in a scene in which the MR system is to be used. With this method, it is possible to indicate the feature addition position according to a range of the positional attitude that can be taken by the HMD in a scene in which the MR system is used.

Modification Example 7-1

In the seventh exemplary embodiment, when the three-dimensional information of the scene in which the MR system is used is not acquired, positions to which the features are to be added have been respectively determined in a plurality of camera viewpoints. In a modification example 7-1, description will be given to a method for determining and indicating the position to which the feature is to be added in consideration of an entire range of the positional attitude when the three-dimensional information of the scene is acquired as described in the sixth exemplary embodiment.

In the present modification example, prior to the processing in step S301, three-dimensional information of the scene and a range of the positional attitude that can be taken by the imaging device 211 of the HMD in the scene will be acquired. The three-dimensional information of the scene will be acquired by the method described in the sixth exemplary embodiment. Ranges of six parameters that can be taken by the camera positional attitude, which is numerically set by the user through the UI, are acquired as a range of the positional attitude that can be taken by the imaging device 211 in the scene. The acquired range of the camera positional attitude is sampled at a predetermined interval, and a plurality of positional attitudes that can be taken by the imaging device 211 is generated. Thereafter, the processing will be executed according to the flowchart illustrated in FIG. 3 described below.

In step S301, the feature distribution acquisition unit 201 generates an image that is supposed to be acquired when observation is executed by the imaging device 211 at each of the camera positional attitudes generated through the above-described sampling. Then, corner points are detected from the image, and a distribution of the corner points is acquired and saved. As a result, a feature distribution of each sampled camera positional attitude is saved.

In step S302, based on the saved feature distribution of each camera positional attitude, the feature addition position determination unit 202 determines a feature addition position. First, feature addition position candidates are generated in the three-dimensional space of the scene. A three-dimensional space of the scene is divided into voxels, and a three-dimensional position at the center of each voxel in which a distance point or model information included in the three-dimensional information of the scene is included is saved as a feature addition position candidate. Next, at each of the camera positional attitudes saved in step S301, the processing in steps S501, S503, and S504 in FIG. 5 described in the above exemplary embodiments is executed, so that the evaluation value is calculated and saved. As a result, evaluation values are saved with respect to all of the combinations of the camera positional attitudes and the feature addition position candidates. Subsequently, with respect to a class of the evaluation values saved therein, the evaluation values are summed up at each of the feature addition position candidates, and each acquired sum is saved as the evaluation value for each feature addition position candidate. Then, a feature addition position candidate having a high evaluation value is taken out from among the feature addition position candidates. This take-out reference itself is similar to that of step S505 in FIG. 5 described in the respective exemplary embodiments.

As described above, the entire range of the positional attitude that can be taken by the HMD is taken into consideration, and thus it is possible to determine a position to which the feature is to be added in order to enable highly-precise calculation of the camera positional attitude more precisely.

Eighth Exemplary Embodiment

In the first to the seventh exemplary embodiments, the feature addition position candidate is generated automatically. In an eighth exemplary embodiment, a method in which a feature addition position for improving the evaluation value for the feature distribution is determined from among a plurality of feature addition position candidates manually set by the user will be described. In the present exemplary embodiment, description will be given to a method for allowing the user to specify the feature addition position candidates in an image captured and acquired by the imaging device 211 of the HMD.

In the present exemplary embodiments, prior to the processing in step S301, an image captured and acquired by the imaging device 211 of the HMD is displayed on a screen, so that the user operates a mouse to specify a plurality of regions to which features can be added in the image. The subsequent processing will be executed by taking these specified regions as feature addition position candidates corresponding to the feature addition position candidates generated in step S502 of the first to the seventh exemplary embodiments.

Figure 10A:
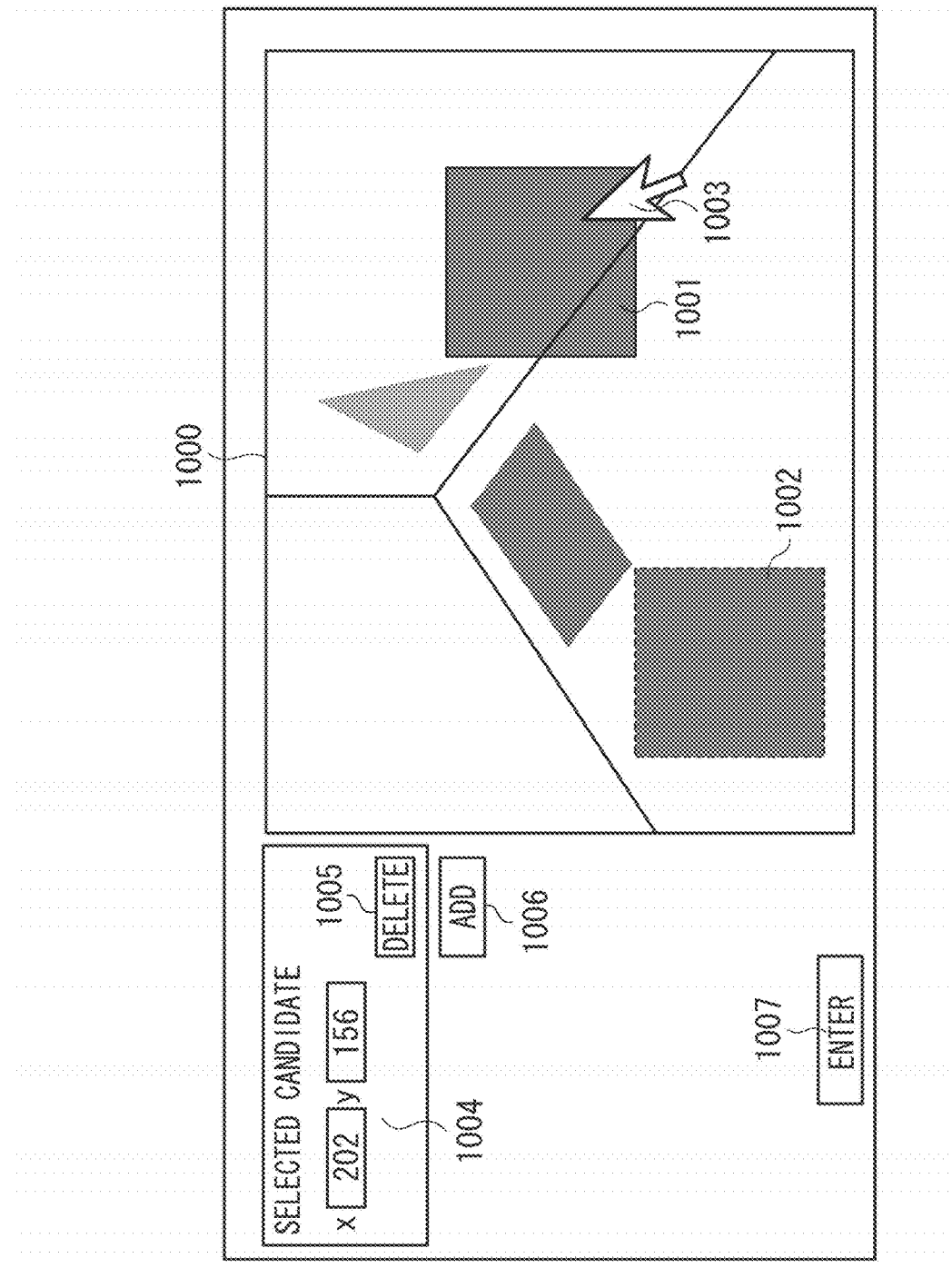
FIG. 10A is a diagram illustrating an example of a screen for setting a feature addition position candidate according to the present invention.

FIG. 10A is a diagram illustrating an example of a screen for setting the feature addition position candidate according to the present exemplary embodiment. A region 1000 is a region for setting the feature addition position candidate onto the image captured by the imaging device 211 of the HMD. From among feature addition position candidates 1001 and 1002, the feature addition position candidate 1001 is selected by a mouse cursor 1003. A position of the feature addition position candidate selected at this moment is displayed on a region 1004 as the attribute information, and the selected feature addition position candidate is deleted when a delete button 1005 is pressed. A button 1006 is a button for adding a feature addition position candidate. An enter button 1007 is a button for confirming the current feature addition position candidate. When the enter button 1007 is pressed, a screen is shifted to a screen indicating the feature addition position illustrated in FIG. 9A.

In the present exemplary embodiment, a feature addition position candidate setting screen in FIG. 10A and a feature addition position indication screen in FIG. 9A are provided separately. However, the evaluation value when the feature is added to the current feature addition position candidate, which is displayed on the region 906, may be displayed on the feature addition position candidate setting screen.

Description has been given to a method for determining the feature addition position or the positional attitude for improving the evaluation value for the feature distribution from among a plurality of candidates of the feature addition position or the positional attitude set by the user. With this method, even in a state where the position to which the feature can be added is limited in the observable space because of the environmental restriction, the feature addition position can be determined and indicated while allowing the user to consider the environmental restriction.

Modification Example 8-1

In the eighth exemplary embodiment, the feature addition position in the image captured by the imaging device 211 of the HMD is specified two-dimensionally.

In a modification example 8-1, description will be given to a method in which a suitable addition positional attitude is acquired by specifying a plurality of addition positional attitude candidates in a case where a predetermined self-standing signboard-like object (hereinafter, referred to as "feature object") is to be newly added and arranged onto the scene, while the three-dimensional information of that scene is acquired as described in the sixth exemplary embodiment.

In the present modification example, prior to the processing in step S301, three-dimensional information of the scene in which the MR system is used, which is acquired by a method similar to the method described in the sixth exemplary embodiment, and model information and a camera positional attitude of a feature object will be acquired. The user sets a plurality of addition positional attitudes in which the feature object in the scene can be arranged through the UI as addition positional attitude candidates of the feature object. In step S503, loop processing is executed to each of the addition positional attitude candidates in which the feature object can be arranged, and in step S504, an image that is supposed to be observed by the imaging device 211 when the feature object is arranged in the addition positional attitude candidate regarded as a target of the loop processing is generated based on the three-dimensional information of the scene, the camera positional attitude in the scene, and the addition positional attitude candidate of the feature object. The feature distribution is acquired from the generated image, and the evaluation value for the feature distribution is calculated and saved. In step S505, the addition positional attitude candidate having the high evaluation value is selected from among the addition positional attitude candidates of the feature object having the saved evaluation values.

Figure 10B:
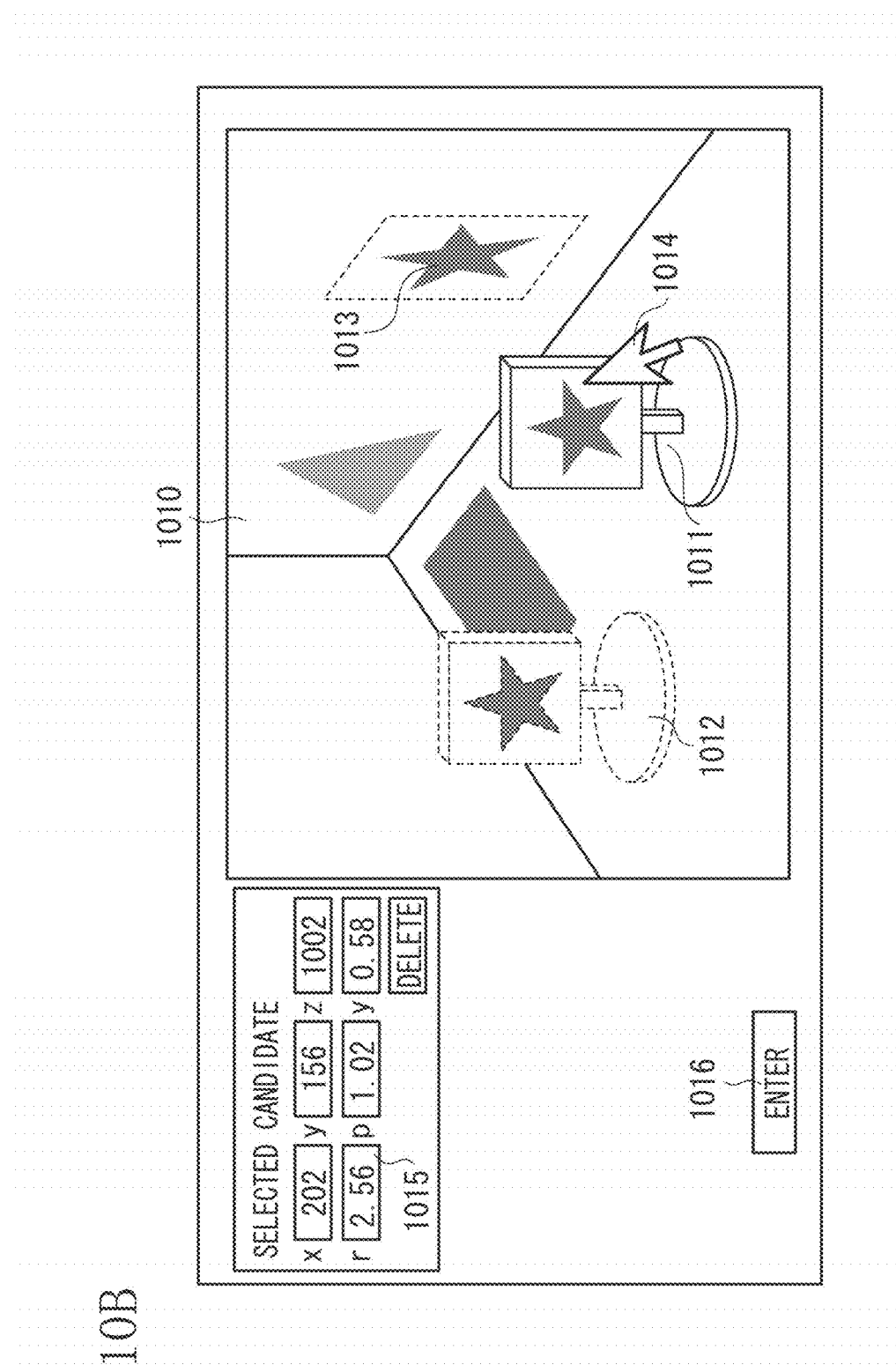
FIG. 10B is a diagram illustrating an example of a screen for setting a feature object addition positional attitude candidate according to the present invention.

FIG. 10B is a diagram illustrating an example of a screen in which the feature object is displayed in the selected positional attitude candidate having the high evaluation value. The user determines the addition positional attitude in which the feature object is to be arranged by operating the screen.

A region 1010 is an image region on which the user sets the addition positional attitude candidate by looking at the three-dimensional information of the scene. A viewpoint at which the three-dimensional information is to be displayed can be operated and set to the optional viewpoint with a mouse cursor 1014. Regions 1011, 1012, and 1013 illustrate addition positional attitude candidates of the feature objects. In the example illustrated in FIG. 10B, signboard-like objects illustrated in the regions 1011 and 1012 and a poster-like object illustrated in the region 1013 are arranged as the feature objects. As described above, objects of various types may be set as the feature objects. Of the above feature objects, the feature objects in the region 1011 selected by the mouse cursor 1014 is expressed by a solid line, and a positional attitude of the selected feature object in the region 1011 is displayed on a region 1015. An enter button 1016 is a button for confirming the current addition positional attitude candidate of the feature object. When the enter button 1016 is pressed, the screen is shifted to a screen for indicating the addition positional attitude of the feature object illustrated in FIG. 9B.

FIG. 9B is a diagram illustrating an example of a screen for indicating the addition positional attitude of the feature object. The addition positional attitude of the feature object is superimposed on the three-dimensional information of the scene and displayed on a region 910. A viewpoint at which the three-dimensional information is to be displayed can be operated and set to the optional viewpoint with a mouse cursor 913. Objects 911 and 912 represent the addition positional attitudes of the feature objects for achieving the target evaluation value, and numerical values displayed on the objects 911 and 912 represent an order in which the addition positional attitudes are added to the feature addition list in step S803 of FIG. 8. Other elements displayed on the screen are the same as those illustrated in FIG. 9A.

Description has been given to a method for acquiring a plurality of addition positional attitude candidates of the feature object set by the user and determining the addition positional attitude of the feature object for improving the evaluation value for the feature distribution from among the acquired addition positional attitude candidates. Through the method, it is possible to determine and indicate the positional attitude of the feature object that is to be added in order to enable highly-precise calculation of the camera positional attitude.

Modification Example 8-2

(Specify a Feature Addition Possible Region and a Feature Addition Impossible Region in a Virtual Space.)

In the eighth exemplary embodiment, although the user has respectively specified the feature addition position candidates, in a modification example 8-2, description will be given to a method in which the user specifies a region to which the feature can be added.

The region to which the feature can be added is specified as a region in the image captured by the imaging device 211 of the HMD or a region in the three-dimensional information of the scene. In step S502 of FIG. 5, the feature addition position candidates are generated in the specified region to which the feature can be added.

Figure 10C:
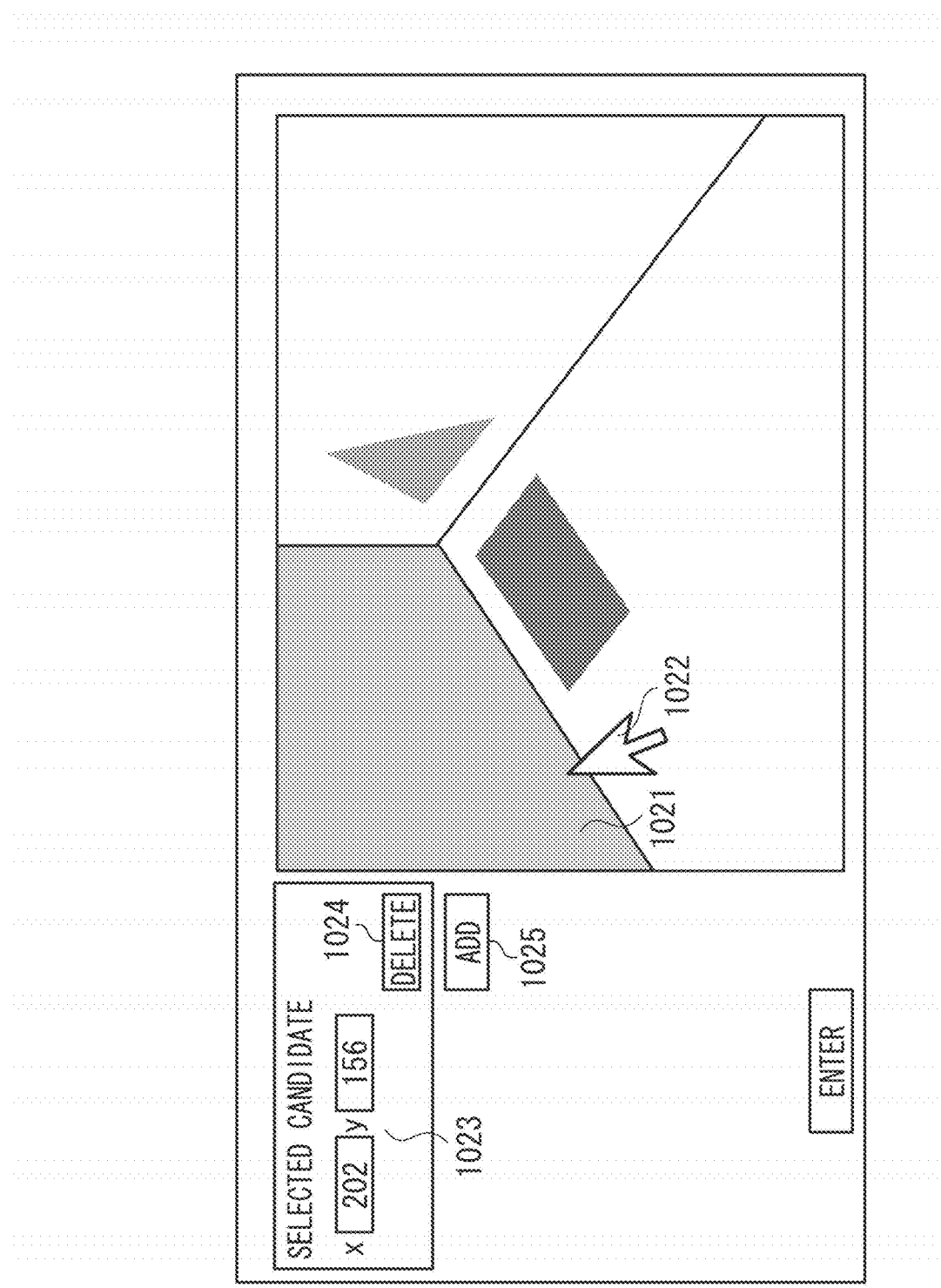
FIG. 10C is a diagram illustrating an example of a screen for setting a region to which a feature can be added according to the present invention.

FIG. 10C is a diagram illustrating an example of a screen for setting a region to which the feature can be added in the image captured by the imaging device 211 of the HMD. A region 1021 is a region to which the feature can be added, which is specified by a mouse cursor 1022. An attribute of the specified region to which the feature can be added is displayed on a region 1023. In FIG. 10C, a central position of the region in the image is displayed as the attribute. A button 1024 is a button for deleting the currently-specified region to which the feature can be added, and a button 1025 is a button for adding a region to which the feature can be added. Although the region to which the feature can be added has been set thereto in the present modification example, a region to which the feature cannot be added may be set to generate the feature addition position candidates in a region other than the feature addition impossible region.

Description has been given to a method for allowing the user to specify a region to which the feature can be added and determining the feature addition position within that region. With this method, it is possible to determine and indicate the addition position of the feature or the addition positional attitude of the feature object while the environmental restriction is taken into consideration.

Ninth Exemplary Embodiment

In the modification example 8-1 of the eighth exemplary embodiment, the user has specified a model type and a positional attitude of the feature object to set candidates of the addition positional attitude of the feature object.

In a ninth exemplary embodiment, description will be given to a method for automatically determining and indicating a model of an appropriate type from among a plurality of pre-registered models while allowing the user to set only the positional attitude of the feature object. Specifically, an evaluation value when each of the registered models is arranged in the specified addition positional attitude candidate of the feature object is calculated and saved, and a combination of the addition positional attitude candidate of the feature object and a type of model having the high evaluation value is determined and indicated.

With this method, it is possible to also indicate a type of feature object that is to be added in order to enable highly-precise calculation of the camera positional attitude.

Tenth Exemplary Embodiment

In the above-described exemplary embodiments, a position to which the feature is to be added is indicated. In a tenth exemplary embodiment, a method for indicating a position to which the feature is to be moved will be described.

The apparatus configuration in FIG. 7 described in the second exemplary embodiment will be used as the apparatus configuration according to the present exemplary embodiment. First, a poster having a movable feature existing in the environment is previously registered and saved as a template. Then, template matching of the pre-registered poster is executed, so that the current position of the poster is recognized in the image captured by the imaging device 211 of the HMD. Further, a wall face that can be a moving destination of the poster is identified from distance point group information measured by the three-dimensional information measurement device 711 by executing plane detection. Then, by executing sampling in a region within the detected wall face, a plurality of moving destination candidates of the recognized poster is generated. Next, an evaluation value for the feature distribution when the poster is moved to each of the moving destination candidates of the poster is calculated by a method similar to the method in step S501 of FIG. 5 described in the respective exemplary embodiments. Then, a predetermined number of moving destinations of the poster having the evaluation values ranked in the higher order is illustrated together with the ranking of the evaluation values.

Through the above-described method, the moving destination of the feature can be indicated in a case where the position of the feature already set thereto is to be moved.

Eleventh Exemplary Embodiment

In the above-described exemplary embodiments, description has been given to a method for identifying and indicating the position to which the feature is to be added to the user. In an eleventh exemplary embodiment, description will be given to a method for determining and indicating a feature that is to be eliminated in order to improve calculation precision of the camera positional attitude based on a distribution of the corner points, specifically density of the corner points.

In the present exemplary embodiment, it is assumed that the camera positional attitude is calculated by minimizing a distance between one corner point in one image and a three-dimensional point or another corner point in another image associated with the one corner point. In such a case, if there are too many corner points existing in a predetermined range, the one corner point may be mistakenly associated with another corner point that should not be associated therewith, and thus the calculation precision of the camera positional attitude may be lowered. Therefore, if the corner points are arranged too densely, a part of the dense corner points is indicated as the corner points to be eliminated. In the present exemplary embodiment, a distribution density of corresponding points in a predetermined range detected from the acquired image is calculated, and corner points of required numbers are selected from the corner points in that range, and indicated as the corner points to be eliminated if the distribution density is higher than a predetermined value. Details of the method will be described below.

Figure 11A:
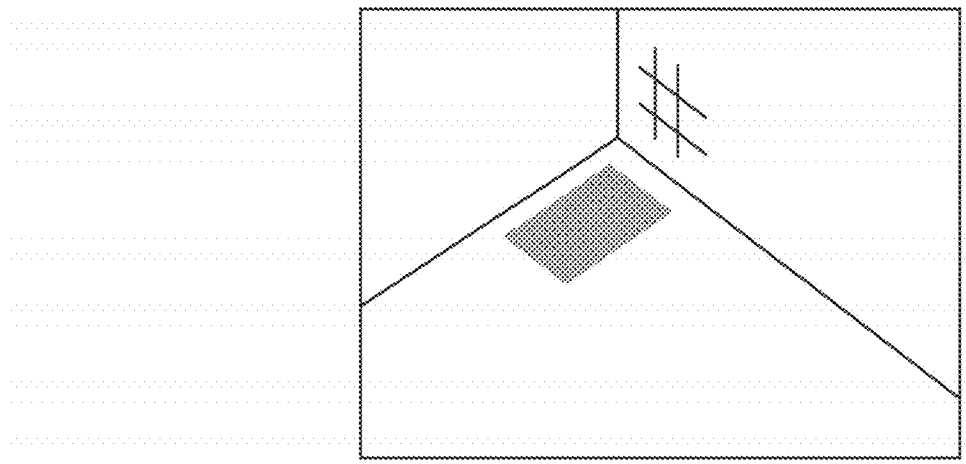
FIG. 11A is a diagram illustrating an example of an acquired image according to the present invention.
Figure 11B:
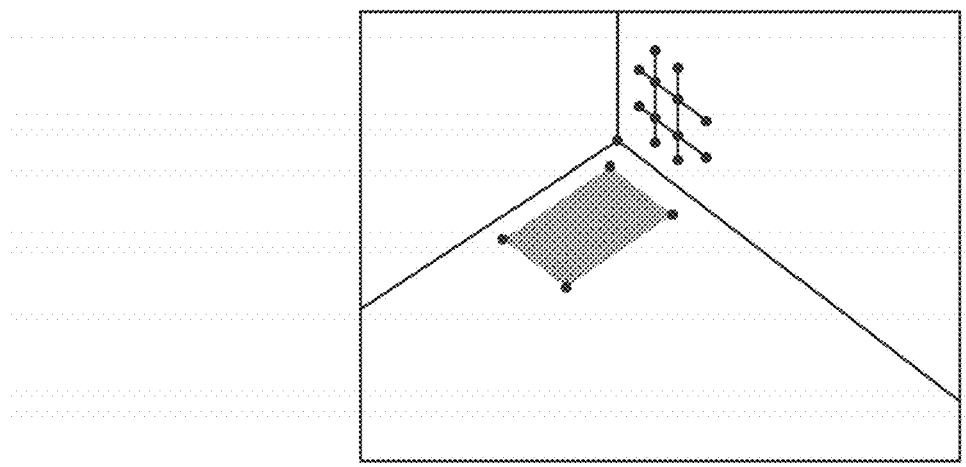
FIG. 11B is a diagram illustrating an example of a result of feature detection according to the present invention.
Figure 11C:
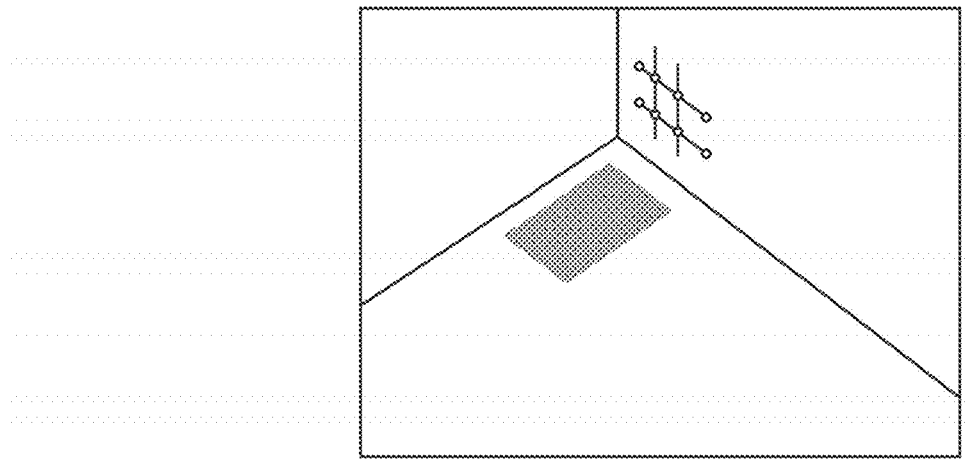
FIG. 11C is a diagram illustrating an example of a screen for indicating a feature to be eliminated according to the present invention.

First, an image is acquired from the imaging device 211 of the HMD and corner points are detected similarly to the first exemplary embodiment. FIG. 11A is a diagram illustrating an example of the acquired image, and FIG. 11B is a diagram illustrating a detection result of the corner points in the acquired image. Next, sampling is executed on the acquired image in a predetermined range, and a distribution density of the corner points in each range is calculated. In a case where the number of corner points existing in each range is greater than a reference number, it is determined that the corner points should be eliminated by the number of excessive corner points. As described above, the corner points to be eliminated from each range is taken out and indicated. FIG. 11C is a diagram illustrating an example of an indication screen. The corner points to be eliminated are expressed by white dots.

As described above, a feature that is to be eliminated in order to calculate the camera positional attitude with high precision is indicated. Through the above-described method, the user can find out the feature to be eliminated without performing a process of trial-and-error, and thus an operation for eliminating the feature can be performed efficiently.

Other Variation of Exemplary Embodiments (Use Features Such as Markers, Blob Features, Edge Features, or Pixels Having High Luminance Gradient.)

In the first to the tenth exemplary embodiments, a corner point is used as a feature. However, the present invention can be executed through a similar method by using any feature as long as the camera positional attitude thereof can be calculated while a detection position can be acquired as the attribute. For example, an identifier described in the patent literature 1 may be coded into a marker and used as a feature.

In this case, in step S301, a distribution of marker detection positions in the image is acquired by detecting the markers from the image instead of the corner points, so that a position to which the marker is to be added can be similarly determined and indicated through the methods described in the first to the tenth exemplary embodiments. Further, as long as a position can be similarly detected from the feature, even if an edge feature, a blob feature such as a scale-invariant feature transform (SIFT) feature amount, or a pixel having high luminance gradient is used as the feature, the present invention can be executed by acquiring a distribution of the detection positions through the processing in step S301. Furthermore, in a case where the edge feature of the image is to be used, by using a position and an orientation at which the edge feature is detected, a feature addition position can be determined so that the position and the orientation of the edge feature becomes uniform through a method similar to the method described in [Modification Example 2-2]. As described above, the present invention is widely applicable to a system that executes calculation of the camera positional attitude using a feature other than the corner point feature.

Generate Feature Addition Position Candidates Through Segmentation Instead of Sampling Rectangular Regions.

In the first to the seventh exemplary embodiments, feature addition position candidates generated or specified by the user in step S501 have been generated by sampling the image with rectangular regions. However, the present invention can be executed by another method if it is possible to completely generate a plurality of candidates of the position to which the feature can be added. For example, from among segments acquired from segmentation of the image using color information, a center of the segment having a predetermined size may be specified as a candidate of the feature addition position. Further, in a case where destination information of the scene can be acquired as described in the sixth exemplary embodiment, from among the segments acquired from destination information through segmentation with planes, a center of the segment having a predetermined size may be specified as a candidate of the feature addition position. As described above, a feature addition position to which the feature is to be added can be easily indicated by specifying a center of the segment having a predetermined size as the feature addition position candidate.

Indicate a Result by Making a Camera Positional Adjustment Based on an Indicated Result.

In the first to the ninth exemplary embodiments, a function for indicating a position or a positional attitude to which the feature is to be added may be mounted on a device that calculates the camera positional attitude based on the feature detected from the image captured by the camera. With this configuration, in a case where the calculation result is not satisfactory when the user calculates the camera positional attitude by walking about the scene, it is possible to appropriately indicate a position or a positional attitude of the feature that is to be added in order to improve the calculation result of the camera positional attitude.

Other Exemplary Embodiments

Further, the present invention can be realized by executing the following processing. In other words, software (a program) for realizing the function of the above-described exemplary embodiments is supplied to a system or an apparatus via a network or various storage media, so that a computer (or a CPU or a micro processing unit (MPU)) of the system or the apparatus reads and executes the program.

Definitions

A feature distribution acquisition unit according to the present invention may be any unit as long as the distribution of features observable by the camera can be acquired. A method described in any of the first to the fourth exemplary embodiments, in which the distribution of features is acquired from the image captured by the camera, is given as an example. Alternatively, as described in the sixth exemplary embodiment, an image that is to be observed by the camera may be generated based on the three-dimensional information of the scene and the camera positional attitude, and the distribution of features may be acquired from that image.

A determination unit configured to determine a feature addition position and/or orientation according to the present invention may be any unit that determines a feature addition position and/or orientation so that the distribution of features suits calculation of the camera positional attitude. Constituent elements of the determination unit includes a method for generating a candidate of the feature addition position and/or orientation, an evaluation scale for evaluating a degree of appropriateness of the distribution of features when the feature is added to the candidate of the feature addition position and/or orientation with respect to calculation of the camera positional attitude, and a reference for taking out a feature addition position and/or orientation to be indicated from among the candidates of the feature addition position and/or orientation based on the evaluation value calculated by the evaluation scale.

A method described in the first, the second, or the seventh exemplary embodiment, in which the image captured by the camera or the three-dimensional space observable by the camera is divided into rectangular regions or voxels to assign two-dimensional positions or three-dimensional positions of the respective regions as the feature addition position candidates, is given as an example of a method for generating a candidate of the feature addition position and/or orientation. Alternatively, as described in [Other variation of exemplary embodiments], segmentation of three-dimensional information of the image or the scene captured by the camera may be executed, and each segment may be assigned as the feature addition position candidate. Further, as described in the eighth exemplary embodiment, candidates of the feature addition position and/or orientation set by the user may be acquired.

The uniformity of the distribution of features described in the first exemplary embodiment is an example of the evaluation scale. Alternatively, as described in the second exemplary embodiment, the extent of the distribution of features may be assigned as the evaluation scale. Further, as described in the fourth exemplary embodiment, calculation precision when the camera positional attitude is calculated in that a distribution may be calculated and assigned as the evaluation scale.

A method for taking out the feature addition position having the high improvement amount of the evaluation value when the feature is added thereto, described in the first exemplary embodiment, is given as an example of the reference for taking out a feature addition position and/or orientation to be indicated from among the candidates of the feature addition position and/or orientation. Alternatively, as described in the fifth exemplary embodiment, the feature addition positions of predetermined numbers from the highest order, having the evaluation values of large improvement amounts, may be taken out. Similarly, as described in the fifth exemplary embodiment, the feature addition position necessary to achieve the target evaluation value may be taken out.

A unit for indicating the feature addition position and/or orientation according to the present invention may be any unit that indicates a determined feature addition position. A method for indicating a feature addition position by superimposing the feature addition position on an image described in the first exemplary embodiment may be given as an example. Alternatively, as described in the eighth exemplary embodiment, a positional attitude of the feature object that is to be added and arranged may be superimposed and indicated on the three-dimensional information of the scene.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more processors that operate to:
acquire features used for deriving a positional attitude of an imaging device from an image captured by the imaging device;
set a plurality of partial regions included in the image as a plurality of candidate regions to which a feature is to be added;
evaluate the plurality of set candidate regions;
determine a position and/or an orientation of a feature to be newly added based on the plurality of evaluated candidate regions; and
output the determined position and/or the orientation.

2. The information processing apparatus according to claim 1, wherein the one or more processors further operate to acquire a distribution of the features in the image based on the acquired features.

3. The information processing apparatus according to claim 2, wherein the one or more processors determine the position and/or the orientation so that the distribution becomes more uniform.

4. The information processing apparatus according to claim 1, wherein the one or more processors further operate to count a number of the acquired features for each of the candidate regions and determine the position and/or the orientation of the feature to be added so that the distribution of the features in the image becomes more uniform, based on the number of the features counted for each of the candidate regions.

5. The information processing apparatus according to claim 1, wherein the one or more processors further operate to acquire three-dimensional positions of the features, and
wherein the one or more processors determine the position and/or the orientation of the feature to be added so that a distribution of the three-dimensional positions of the features becomes more uniform.

6. The information processing apparatus according to claim 2, wherein the one or more processors further operate to determine the position and/or the orientation of the feature to be added so that the distribution of the acquired features is widened.

7. The information processing apparatus according to claim 2, wherein the one or more processors further operate to determine the position and/or the orientation of the feature to be added so that precision of the positional attitude of the imaging apparatus derived based on a distribution acquired by newly adding a feature to the distribution of the acquired features is improved.

8. The information processing apparatus according to claim 2, wherein the one or more processors further operate to acquire an evaluation value for the distribution of the features.

9. The information processing apparatus according to claim 8, wherein the one or more processors operate to determine the position and/or the orientation of the feature to be added so that the evaluation value is increased.

10. The information processing apparatus according to claim 8, wherein the one or more processors further operate to acquire a target value of the evaluation value, and
wherein the one or more processors operate to determine a position and/or an orientation of a feature in which the evaluation value exceeds the target value as the position and/or the orientation of the feature to be added.

11. The information processing apparatus according to claim 8, wherein the one or more processors operate to determine a position and/or an orientation of a feature in which an improvement amount of the evaluation value is greater than a predetermined value as the position and/or the orientation of the feature to be added.

12. The information processing apparatus according to claim 1,
wherein the one or more processors operate to determine that the determined position and/or the orientation is a position to which a feature is to be newly added,
wherein the one or more processors further operate to set a region to which the feature can be added from an actual scene, and
wherein the one or more processors operate to determine the position to which the feature is to be added from the set region.

13. The information processing apparatus according to claim 1,
wherein the one or more processors operate to determine that the determined position and/or the orientation is a position to which a feature is to be newly added,
wherein the one or more processors further operate to set a region to which the feature is not added from an actual scene, and
wherein the one or more processors operate to determine the position to which the feature is to be added from among regions excluding the set region.

14. The information processing apparatus according to claim 1, wherein the one or more processors superpose information relating to the position and/or the orientation of the feature to be added onto an image captured by the imaging device and display the resultant image on a display.

15. The information processing apparatus according to claim 1, wherein the imaging device is provided on a head-mounted display apparatus.

16. The information processing apparatus according to claim 1, wherein the one or more processors further operate to derive the positional attitude of the imaging device based on the features.

17. An information processing apparatus comprising:
one or more processors that operate to:
acquire features which are included in an actual scene captured by an imaging device and used for deriving a positional attitude of the imaging device;
determine a feature to be newly deleted, from among features included in the actual scene, based on a distribution of the acquired features; and
output an image of the actual scene including one or more indicators showing where the determined feature has been deleted from the actual scene.

18. An information processing method comprising:
acquiring features used for deriving a positional attitude of an imaging device from an image captured by the imaging device;
setting a plurality of partial regions included in the image as a plurality of candidate regions to which a feature is to be added;
evaluating the plurality of set candidate regions;
determining a position and/or an orientation of a feature to be newly added based on the plurality of evaluated candidate regions; and
outputting the determined position and/or the orientation.

19. A non-transitory computer-readable storage medium storing at least one program for causing a computer to execute an information processing method, the information processing method comprising:
acquiring features used for deriving a positional attitude of an imaging device from an image captured by the imaging device;
setting a plurality of partial regions included in the image as a plurality of candidate regions to which a feature is to be added;
evaluating the plurality of set candidate regions;
determining a position and/or an orientation of a feature to be newly added based on the plurality of evaluated candidate regions; and
outputting the determined position and/or the orientation.

* * * * *